(12) United States Patent
Song et al.

(10) Patent No.: US 12,087,984 B2
(45) Date of Patent: Sep. 10, 2024

(54) HYBRID REDOX FUEL CELL SYSTEM

(71) Applicant: ESS TECH, INC., Wilsonville, OR (US)

(72) Inventors: Yang Song, West Linn, OR (US); Craig Evans, West Linn, OR (US)

(73) Assignee: ESS TECH, INC., Wilsonville, OR (US)

( * ) Notice: Subject to any disclaimer, the term of this patent is extended or adjusted under 35 U.S.C. 154(b) by 113 days.

(21) Appl. No.: 17/929,627

(22) Filed: Sep. 2, 2022

(65) Prior Publication Data

US 2023/0088434 A1    Mar. 23, 2023

Related U.S. Application Data

(60) Provisional application No. 63/261,408, filed on Sep. 20, 2021.

(51) Int. Cl.
*H01M 8/00* (2016.01)
*H01M 4/90* (2006.01)
*H01M 8/06* (2016.01)
*H01M 8/18* (2006.01)

(52) U.S. Cl.
CPC ......... *H01M 8/188* (2013.01); *H01M 4/9016* (2013.01); *H01M 8/0693* (2013.01)

(58) Field of Classification Search
CPC .. H01M 8/188; H01M 4/9016; H01M 8/0693; Y02E 60/50
See application file for complete search history.

(56) References Cited

U.S. PATENT DOCUMENTS

| | | | |
|---|---|---|---|
| 8,877,365 B2 * | 11/2014 | Keshavarz | H01M 14/005 429/105 |
| 2022/0134292 A1 | 5/2022 | Liu et al. | |
| 2022/0200030 A1 | 6/2022 | Liu et al. | |
| 2022/0200035 A1 | 6/2022 | Kender | |
| 2022/0209274 A1 | 6/2022 | Nicholls et al. | |

FOREIGN PATENT DOCUMENTS

EP    4016681 A1    6/2022

\* cited by examiner

*Primary Examiner* — Cynthia H Kelly
*Assistant Examiner* — Monique M Wills
(74) *Attorney, Agent, or Firm* — McCoy Russell LLP

(57) ABSTRACT

A hybrid redox fuel cell system includes a hybrid redox fuel cell and an electrochemical cell. The hybrid redox fuel cell includes an anode side through which hydrogen is flowed and a cathode side through which liquid electrolyte is flowed, the liquid electrolyte including a metal ion at a higher oxidation state and the metal ion at a lower oxidation state. An anode side of the electrochemical cell is fluidly connected to the cathode side of the hybrid redox fuel cell. At the hybrid redox fuel cell, power is generated by reducing the metal ion at the higher oxidation state to the lower oxidation state at the cathode side while oxidizing the reductant at the anode side. At the anode side of the electrochemical cell, the metal ion at the lower oxidation state is oxidized to the higher oxidation state while the power is generated.

20 Claims, 11 Drawing Sheets

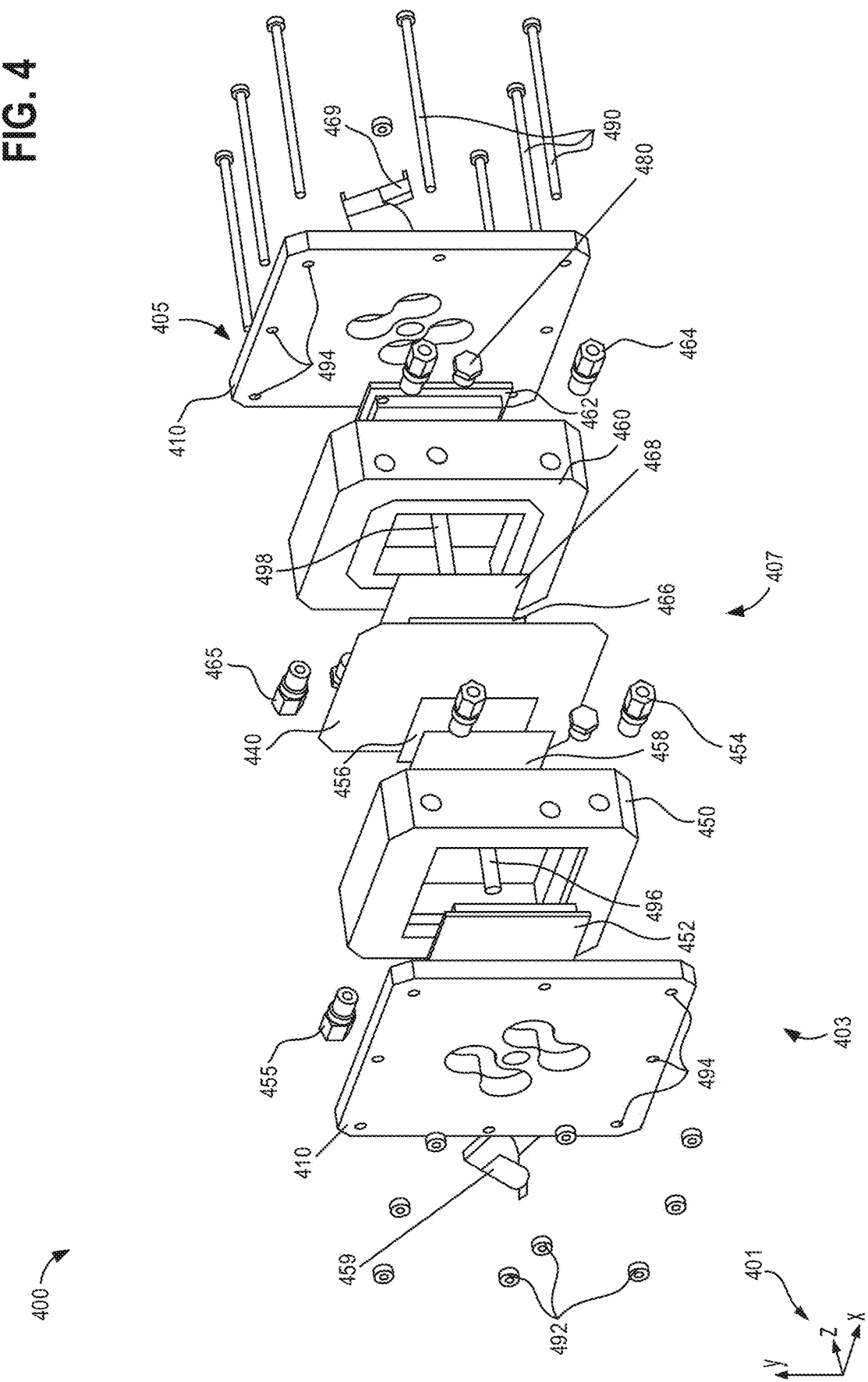

FIG. 12
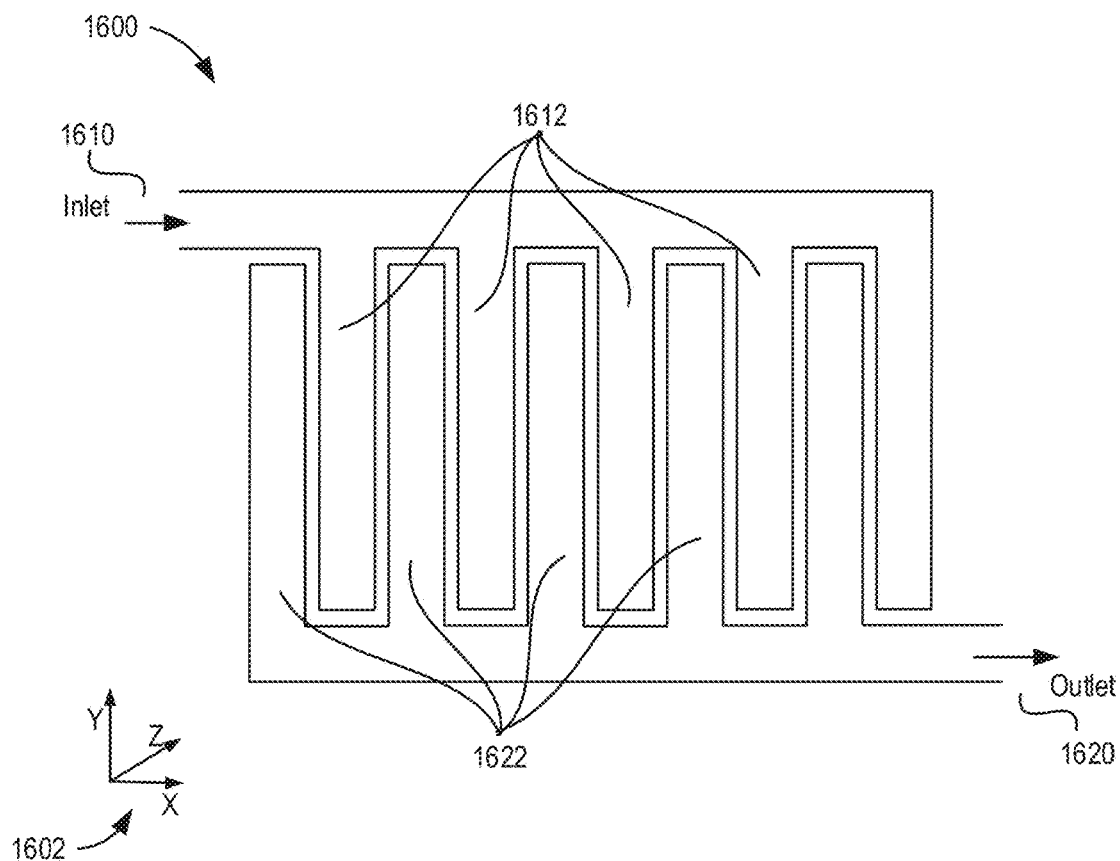
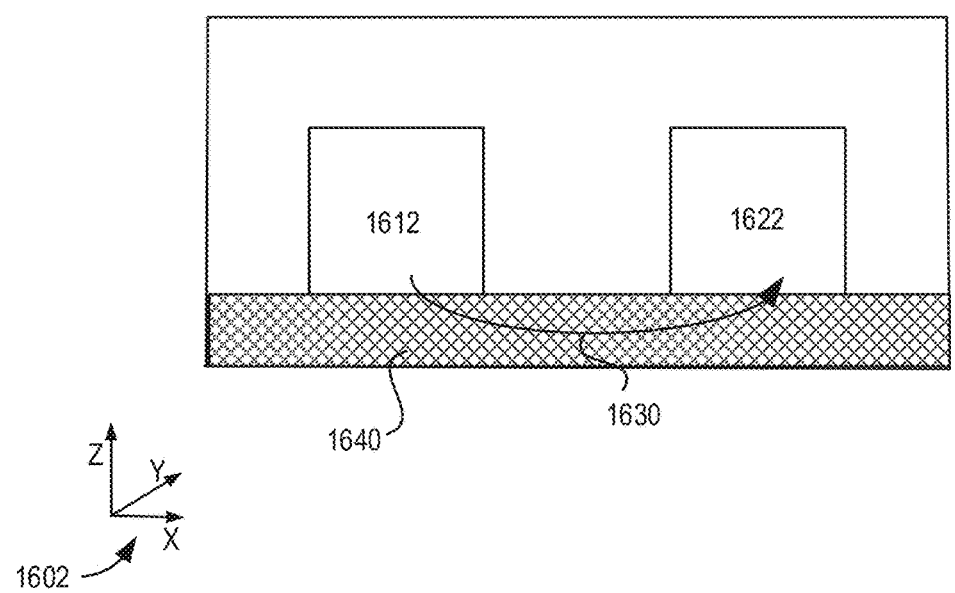

HYBRID REDOX FUEL CELL SYSTEM

CROSS REFERENCE TO RELATED APPLICATIONS

The present application claims priority to U.S. Provisional Application No. 63/261,408 entitled "HYBRID REDOX FUEL CELL SYSTEM" filed Sep. 20, 2021. The entire contents of the above identified application is hereby incorporated by reference for all purposes.

FIELD

The present description relates generally to a hybrid redox fuel cell system and methods of operating the hybrid redox fuel cell system.

BACKGROUND AND SUMMARY

Hydrogen-air fuel cell technologies have not achieved widespread adoption due to their high cost, lower electrical efficiency, and reliability challenges. These issues are largely a result of the slow kinetic rate and high electrochemical potential of the cathode oxygen reduction reaction (ORR). In particular, the ORR utilizes expensive precious metal catalysts and complex three-boundary electrode designs to drive the ORR. Further still, the high ORR electrochemical potential (~1.2V) contributes to several major fuel cell stack degradation mechanisms, such as carbon corrosion and membrane degradation. Consequently, traditional fuel cell systems utilize expensive raw materials, such as graphitized electrodes and bipolar plates, which undergo complex and costly manufacturing treatment processes in order to mitigate material degradation caused by the high electrochemical potential. Further still, to achieve increased performance and system efficiency desirable for economic and practical viability, traditional fuel cell systems include additional systems for heat recovery, water management, and other complex system designs to increase stack performance, which increases overall system complexity and reduces overall system reliability.

In contrast with hydrogen-air fuel cells, a hybrid redox fuel cell replaces oxygen with a metal ion redox couple as the oxidant, whereby reduction of a metal ion oxidant at the cathode occurs concomitantly with hydrogen oxidation at the anode, as represented by equations (1) and (2). In equation (2), $M^{x+}$ represents a higher oxidation state metal ion, and $M^{(x-y)+}$ represents a lower oxidation state metal ion, wherein the lower oxidation state is lower in oxidation number than the higher oxidation state. As non-limiting examples, the metal, M, utilized for the metal ion redox couple may include manganese ($Mn^{2+}/MnO_2$), vanadium, copper, and iron. In one example, the metal ion redox couple may include a ferric ion/ferrous ion redox couple, with the hybrid redox fuel cell reactions represented by equations (1) and (2'):

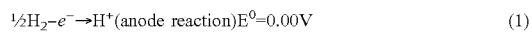
$$\tfrac{1}{2}H_2 - e^- \rightarrow H^+ \text{(anode reaction)} E^0 = 0.00V \qquad (1)$$

$$M^{x+} + ye^- \rightarrow M^{(x-y)+} \text{(generalized cathode reaction)} \qquad (2)$$

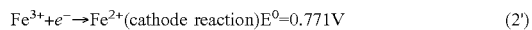
$$Fe^{3+} + e^- \rightarrow Fe^{2+} \text{(cathode reaction)} E^0 = 0.771V \qquad (2')$$

When the standard potential ($E^0$) at the cathode is greater than the standard potential at the anode, the resulting Gibbs free energy of the anode and cathode reactions is negative and therefore, the reactions given by equations (1) and (2) occur spontaneously. As such, the hybrid redox fuel cell achieves a substantially higher theoretical electrical efficiency as compared to conventional hydrogen-air fuel cells. Due to the high energy density of hydrogen and the low cost of earth abundant metal ion such as iron, there is substantial commercial interest in the development of hybrid redox fuel cells. However, to enable long term energy storage, regeneration of the metal ion is desirable to preclude storage and handling of large volumes of liquid electrolyte. A common regeneration scheme includes air oxidation of the reduced metal oxidant (e.g., the lower oxidation state metal ion), which is thermodynamically favorable, but kinetically slow due to the oxygen reduction reaction and mass transfer limitations. As such, although hybrid redox fuel cells are able to achieve higher theoretical electrical efficiencies as compared to hydrogen-air fuel cells, power generation in hybrid redox fuel cell tends to be limited by an attainable rate of oxidant regeneration.

One approach, that at least partially addresses the issues discussed above, includes a hybrid redox fuel cell system including a hybrid redox fuel cell and an electrochemical cell. The hybrid redox cell includes an anode side through which hydrogen is flowed and a cathode side through which liquid electrolyte is flowed, the liquid electrolyte including a metal ion at a higher oxidation state and the metal ion at a lower oxidation state. An anode side of the electrochemical cell is fluidly connected to the cathode side of the hybrid redox fuel cell, and power is generated by way of reducing the metal ion from the higher oxidation state to the lower oxidation state at the cathode side of the hybrid redox fuel cell while oxidizing the reductant at the anode side of the hybrid redox fuel cell, and while oxidizing the metal ion at the lower oxidation state to the higher oxidation state at the anode side of the electrochemical cell.

By oxidizing the lower oxidation state metal ion at the anode of the electrochemical cell, mass transfer limitations can be reduced and the technical effect of increasing a rate of regeneration of the metal ion oxidant (e.g., the metal ion at the higher oxidation state) can be achieved. Furthermore, the electrochemical cells can easily be stacked and arranged into compact modular cell assemblies. As such, bringing additional electrochemical cells online or taking electrochemical cells offline to balance regeneration capacity with hybrid redox fuel cell capacity can be facilitated more easily, while reducing operational downtime. Further still, the compactness of the cell assemblies can aid in reducing a volume of the overall hybrid redox fuel system, thereby reducing operational and manufacturing costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows an exploded view of an example cell assembly for the hybrid redox fuel cell of FIG. 1.

FIG. 12 shows a schematic of an example structured flow field for the hybrid redox fuel cell of FIG. 1 and the electrochemical cell oxidant regeneration reactor of FIG. 6.

DETAILED DESCRIPTION

Figure 2:
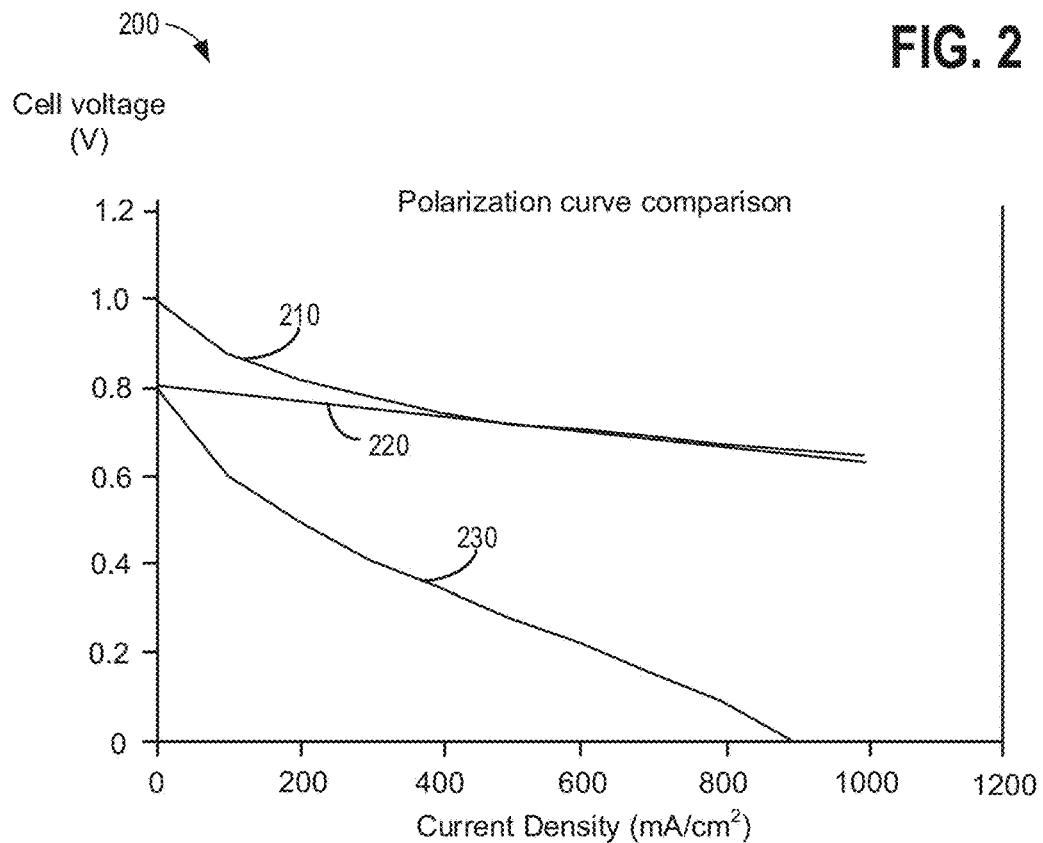
FIGS. 2 and 3 show example graphs comparing performance data of various fuel cells.
Figure 3:
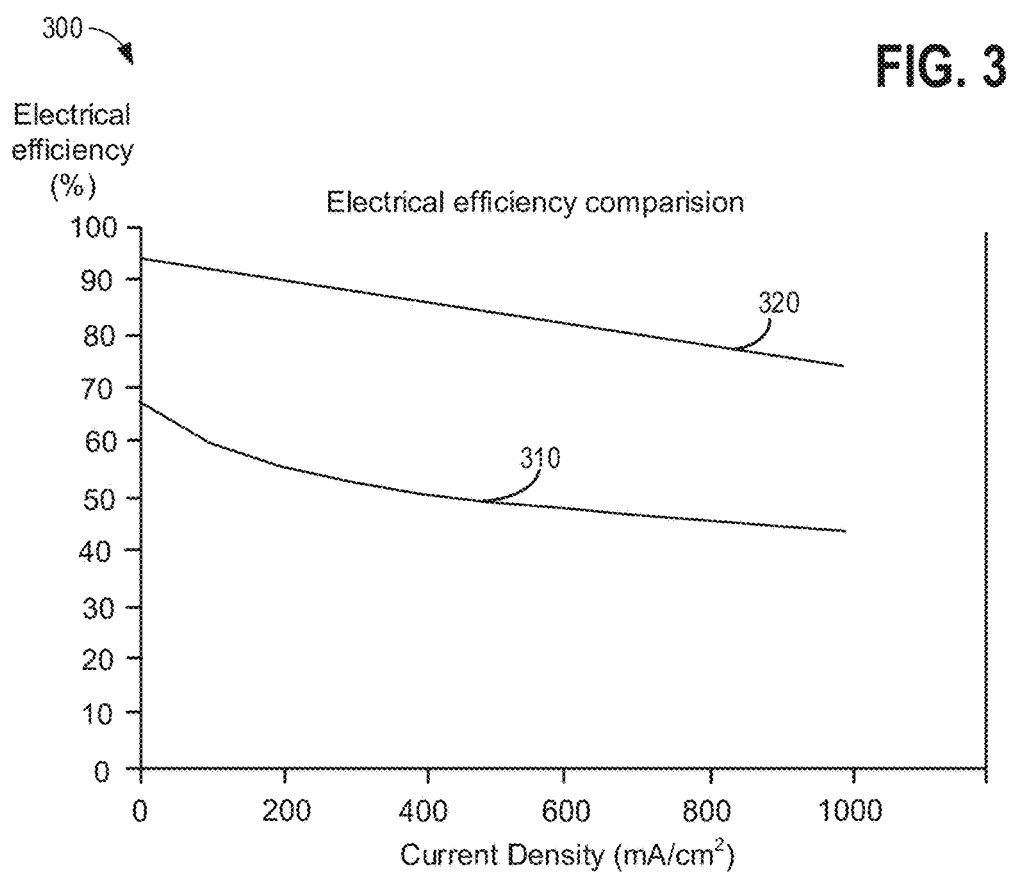
Figure 5A:
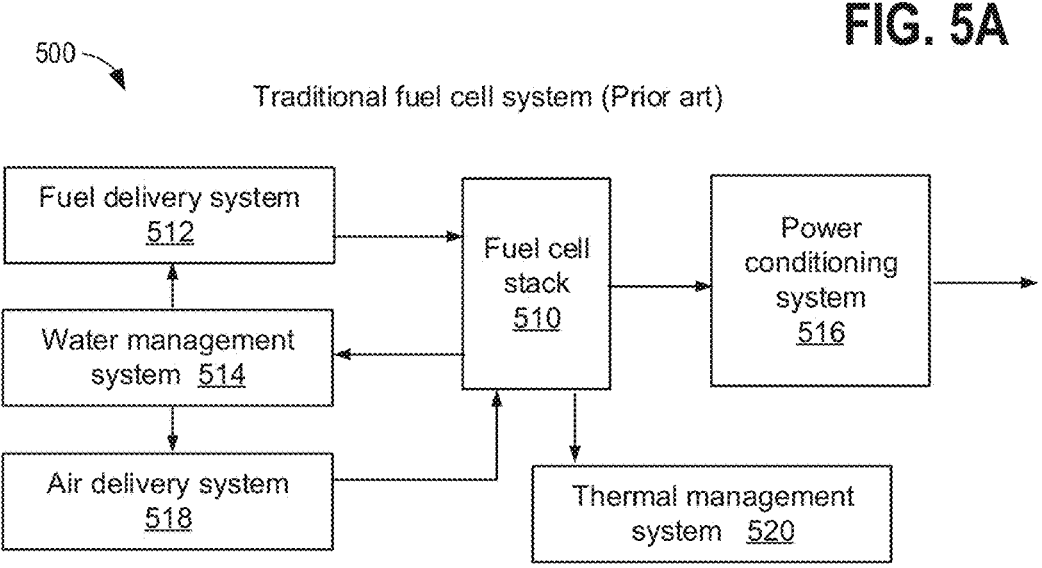
FIGS. 5A, 5B, and 5C show example process flow schematics of a conventional fuel cell system and a hybrid redox fuel cell system, including an oxidant delivery system.
Figure 5B:
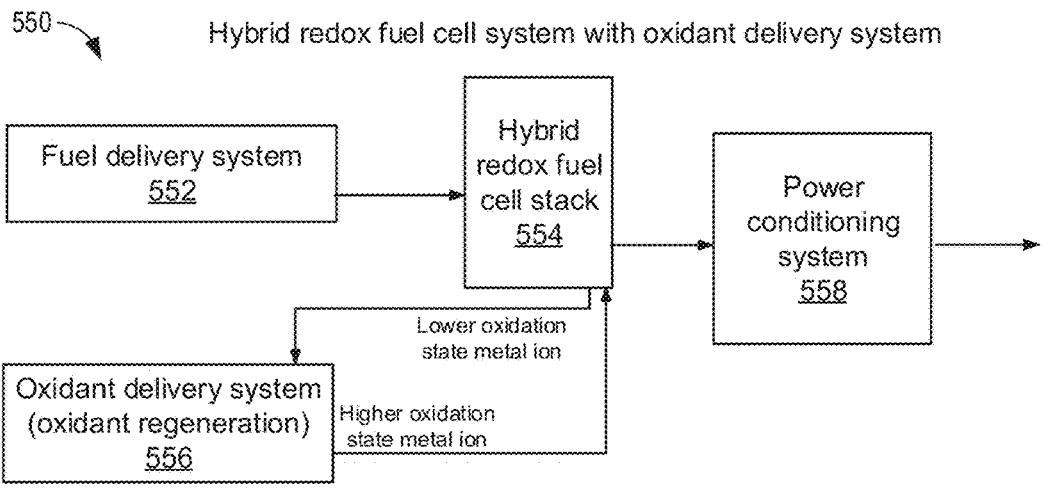
Figure 5C:
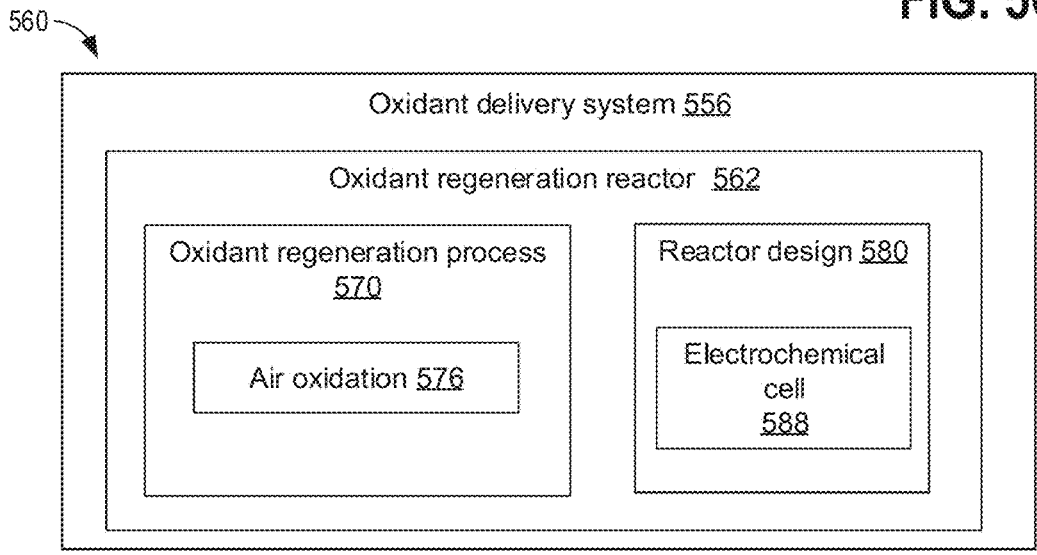
Figure 6:
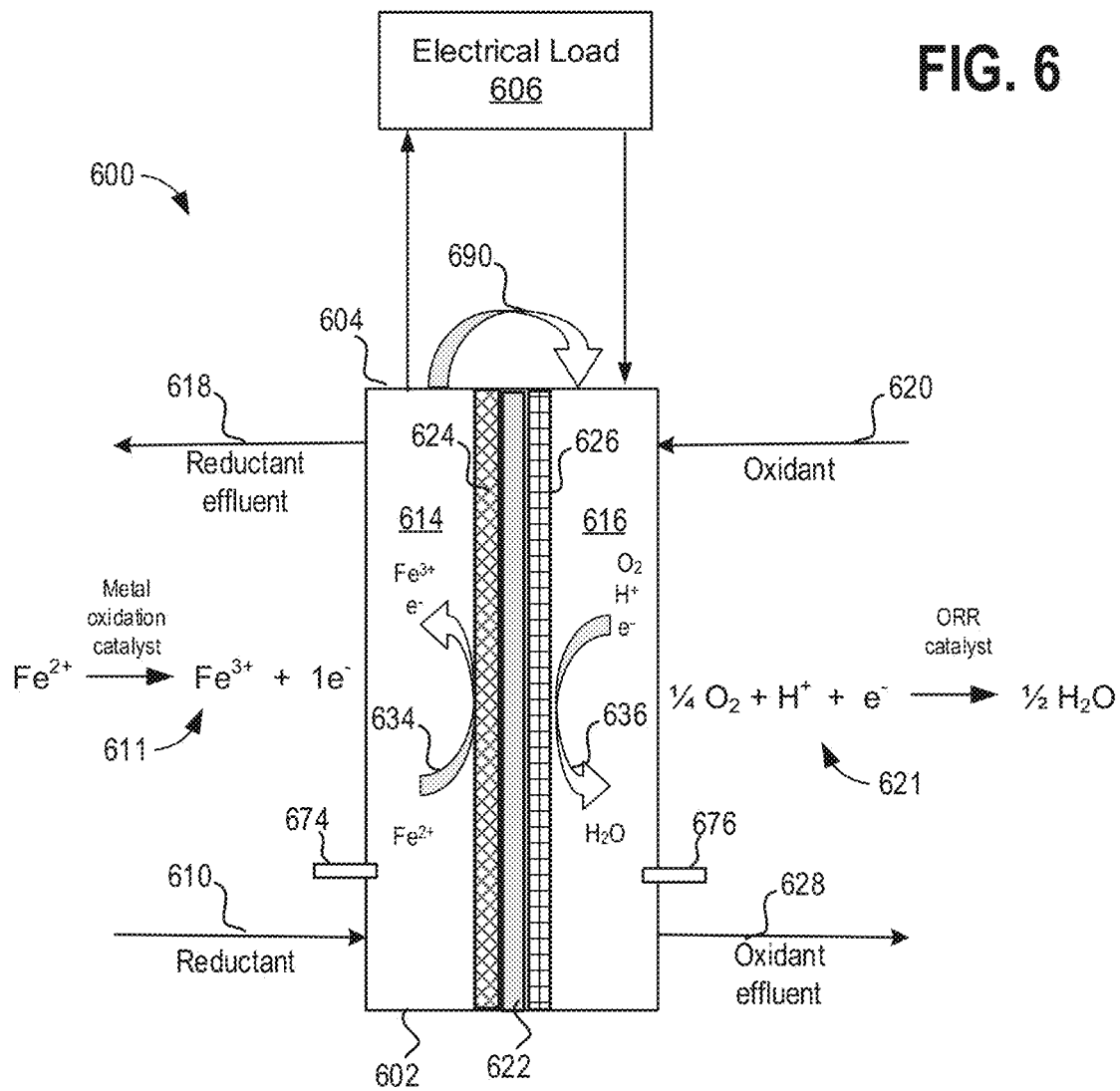
FIG. 6 shows a schematic of an electrochemical cell oxidant regeneration reactor for the hybrid redox fuel cell of FIG. 1.
Figure 7:
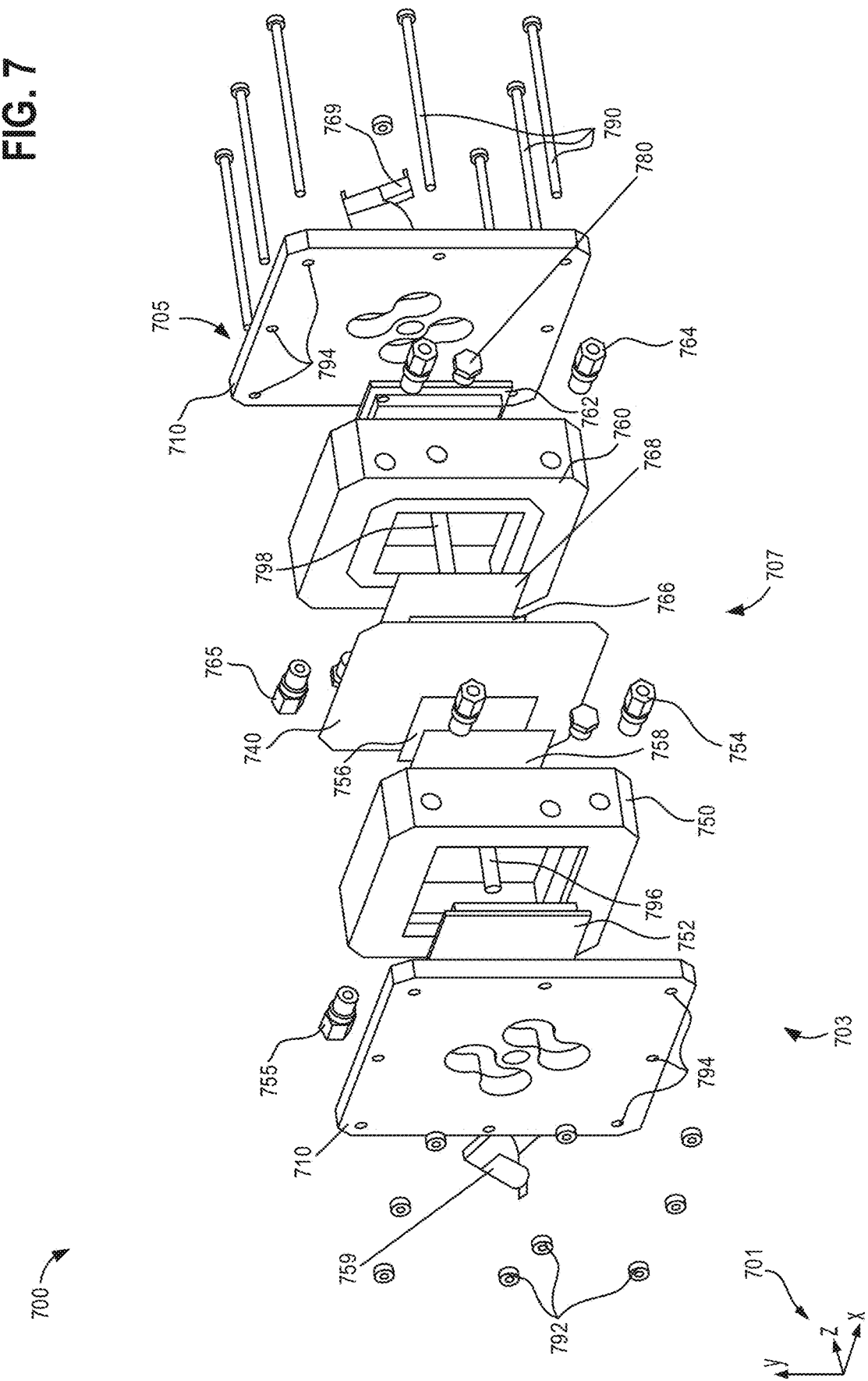
FIG. 7 shows an exploded view of an example cell assembly for the electrochemical cell oxidant regeneration reactor of FIG. 6.
Figure 8:
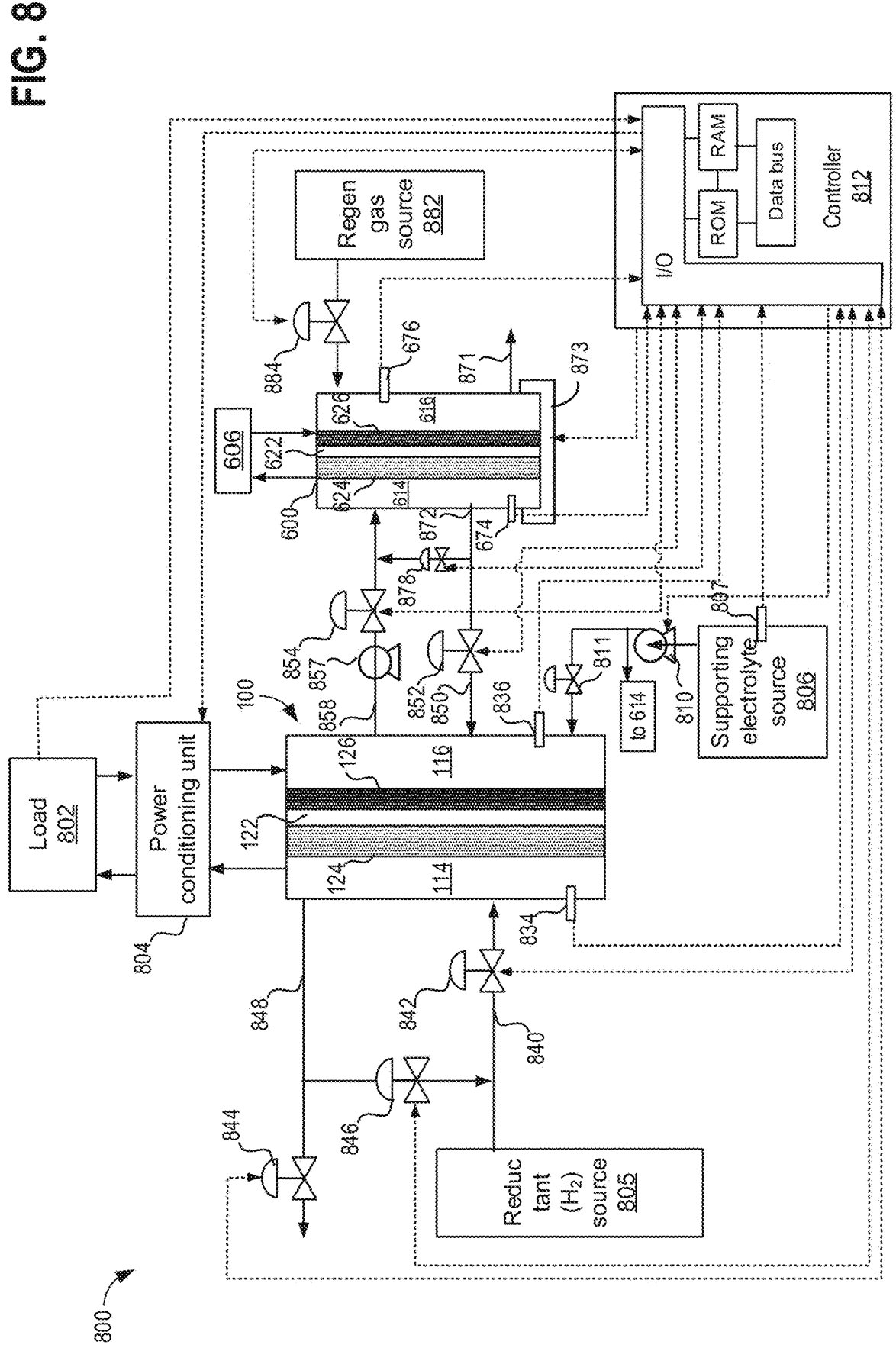
FIG. 8 shows a schematic of an example hybrid redox fuel cell system including the hybrid redox fuel cell of FIG. 1 and the electrochemical cell oxidant regeneration reactor of FIG. 6.
Figure 10:
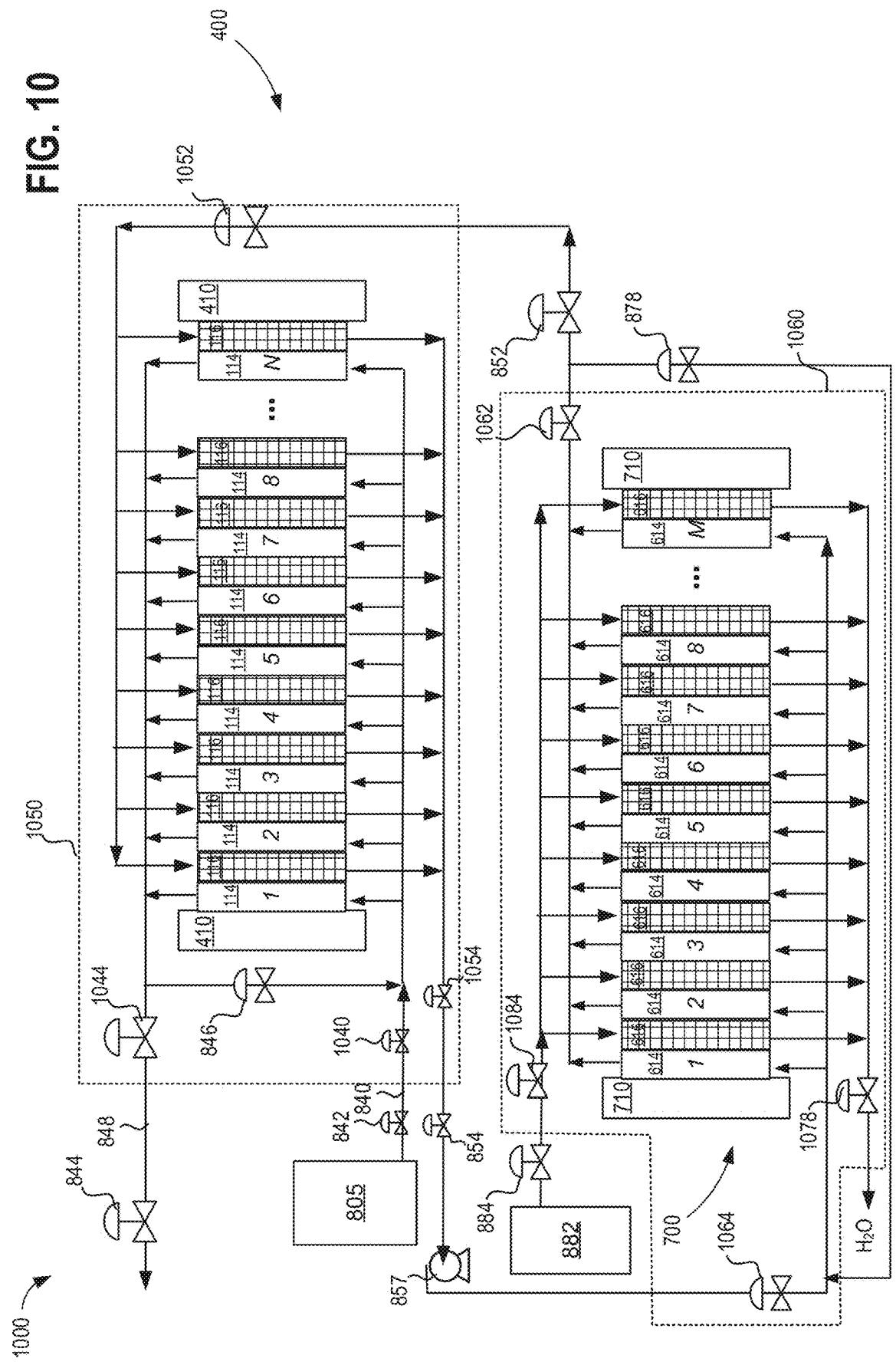
FIGS. 10 and 11 show schematics of a hybrid redox fuel cell system embodiments including a plurality of the hybrid redox fuel cells of FIGS. 1 and 4, and a plurality of the electrochemical cell oxidant regeneration reactors of FIG. 6.
Figure 11:
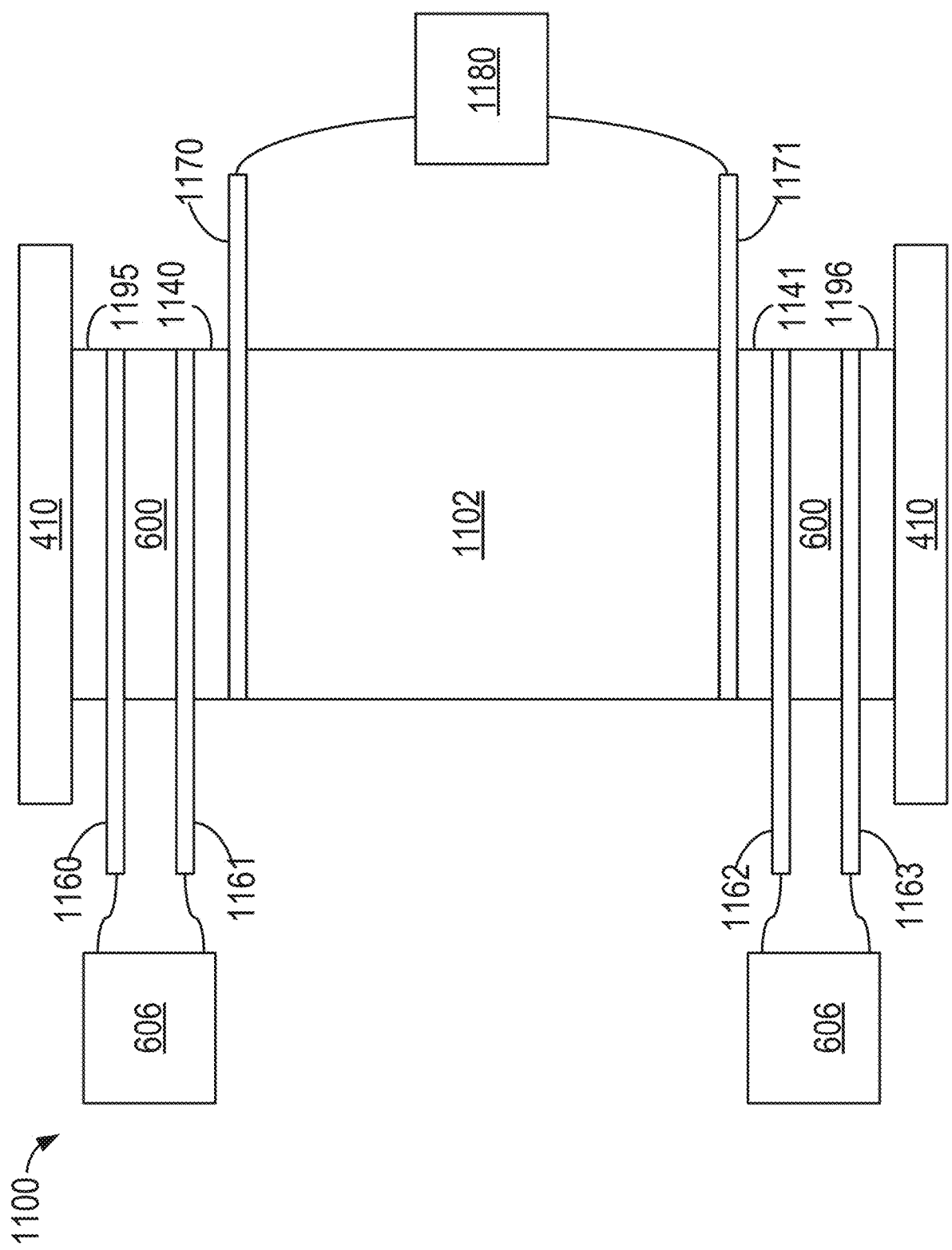

The following description relates to systems and methods for a hybrid redox fuel cell system. In an exemplary embodiment, the hybrid redox fuel cell system includes a hybrid redox fuel cell depicted schematically in FIG. 1. The hybrid redox fuel cell includes structured flow fields, as shown in FIG. 12, for increasing electroactive surface area of the electrode and for increasing distribution of the electrolyte to and from the electroactive surface area of the electrode. Furthermore, the hybrid redox fuel cell can be configured as a cell assembly shown in FIG. 4, and multiple hybrid redox fuel cells can be stacked in series and/or parallel within a cell assembly to form a hybrid redox fuel cell stack or power module. The performance of the hybrid redox fuel cell as compared to a conventional fuel cell is shown in FIGS. 2 and 3. In contrast with a conventional fuel cell system as shown in FIG. 5A, the hybrid redox fuel cell system includes an oxidant delivery system, as shown in FIG. 5B and FIG. 5C, to provide for regeneration of the redox oxidant. In one embodiment, the oxidant delivery system includes an electrochemical cell oxidant regeneration reactor configuration, as shown in FIG. 6, and a cell assembly including a stack of electrochemical cell oxidant regeneration reactors is depicted in FIG. 7. In some embodiments, the electrochemical cell oxidant regeneration reactors may each include structured flow fields, similar to the structured flow fields of the hybrid redox fuel cell, as shown in FIG. 12. FIG. 8 illustrates a hybrid redox fuel cell system, including the hybrid redox fuel cell and the electrochemical cell oxidant regeneration reactor of FIG. 6. Operation of the hybrid redox fuel cell system may be performed by way of method illustrated in the flow chart of FIG. 9. In one example, the power generation capacity of the hybrid redox fuel cell system can be increased by including a plurality of hybrid redox fuel cells coupled with a plurality of oxidant regeneration reactors, as shown in FIG. 10. Furthermore, the oxidant regeneration reactors and the hybrid redox fuel cells may be integrated within the same power module, as depicted in FIG. 11.

Figure 1:
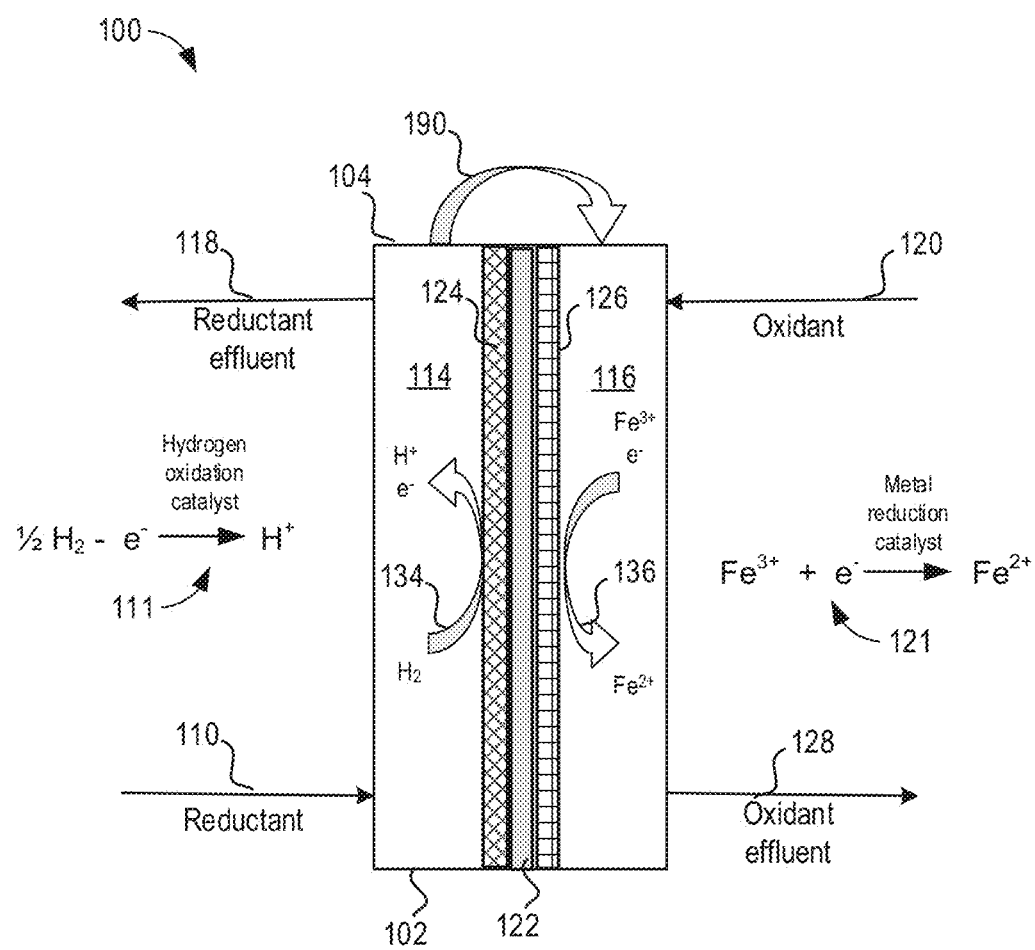
FIG. 1 shows a schematic diagram of an example hybrid redox fuel cell.

Turning now to FIG. 1, it illustrates a process schematic of an example hybrid redox fuel cell 100. In one embodiment, a hybrid redox fuel cell system 800 may include one or more hybrid redox fuel cells 100. FIG. 1 depicts a non-limiting example of a hydrogen-ferric/ferrous ion hybrid redox fuel cell; however, the hybrid redox fuel cell systems and methods described herein may additionally or alternatively include other types of hybrid redox fuel cells. Herein, anode refers to an electrode where electroactive material loses electrons and cathode refers to an electrode where electroactive material gains electrons. As illustrated in FIG. 1, reductant (e.g., hydrogen gas) 110 is supplied to the anode side of a hybrid redox fuel cell 100, where the reductant 110, flows through the anode compartment 114 (also described herein as anode side) flow field to the anode 124. In some examples, the reductant includes only gaseous reductant without any liquid reductant. As indicated by the hydrogen oxidation chemical equation 111 and the reaction arrow 134, within the anode compartment 114, the hydrogen gas is fluidly contacted with a hydrogen oxidation catalyst, and electrons are catalytically stripped from the hydrogen to produce protons (e.g., hydrogen ions) and electrons, according to equation (1). In one example, the hydrogen oxidation catalyst may be supported on a surface of the anode 124 so that upon oxidation of the hydrogen, electrons are conducted from the hybrid redox fuel cell 100 by way of an anode current collector (not shown in FIG. 1) conductively coupled to the anode 124, as depicted schematically by current flow arrow 190. In one example, the hydrogen oxidation catalyst may include a platinum-based catalyst supported on a carbon substrate. In other examples, the hydrogen oxidation catalyst may include a small amount (e.g., 0.02 mg/cm$^2$ to >0.2 mg/cm$^2$) of one or a combination of precious metals, such as Pt, Pd, Ru, Rd or their alloys, supported on a conductive carrier, such as carbon.

Simultaneously with the oxidation of reductant 110 at the anode 124, an oxidant 120 (e.g., ferric ion electrolyte) is supplied to the cathode side of the hybrid redox fuel cell 100, where the oxidant 120 flows through a flow field of the cathode compartment 116 (also herein referred to as cathode side 116) to the cathode 126. In the case of a hydrogen-ferric/ferrous ion hybrid redox fuel cell, as indicated by the ferric ion reduction chemical equation 121 and the reaction arrow 136, within the cathode compartment 116, the ferric ion solution is fluidly contacted at a metal reduction catalyst such as a carbon catalyst (e.g., carbon surface) at the cathode 126, and electrons are accepted by ferric ions, thereby reducing the ferric ions and producing ferrous ions. The carbon surface at the cathode 126 may include a porous carbon felt or foam, to aid in increasing surface area for fluidly contacting the liquid electrolyte (e.g., ferric ions in solution) with the cathode surface. Furthermore, the carbon surface may be supported on the cathode 126 so that electrons conductively supplied into hybrid redox fuel cell (e.g., as depicted by current flow arrow 190) at the cathode surface by the cathode current collector (not shown in FIG. 1) conductively coupled thereto may be fluidly contacted at the carbon surface concomitantly with the ferric ion to produce ferrous ion.

The oxidant 120 may include a metal ion electrolyte solution, whereby the metal ion electrolyte includes one or more of a higher oxidation state metal ion and a lower oxidation state metal ion. The higher oxidation state metal ion refers to the oxidized state of the oxidant 120 and the lower oxidation state metal ion refers to the reduced state of the oxidant 120. Accordingly, the lower oxidation state metal ion has a lower oxidation number than the higher oxidation state metal ion. In the example of FIG. 1, the metal ion electrolyte solution includes a solution of ferric ions, such as an ionic solution of a ferric salt. Choice of oxidant electrolyte composition, including metal ion salts, ion complexes, and supporting conductive species, can influence electrolyte resistivity, charge-transfer kinetics and overall kinetic rates of oxidant reduction at the hybrid redox fuel cell cathode. In one non-limiting example, the oxidant electrolyte solution may include ferric sulfate and ferrous sulfate. Furthermore, the oxidant electrolyte solution may include sulfuric acid solution, and the oxidant electrolyte solution may include ferrous and ferric free ions and/or complex compounds.

The oxidant electrolyte may include ferric chloride and ferrous chloride. A concentration of the oxidant electrolyte may be maintained up to a threshold oxidant electrolyte concentration. When the oxidant electrolyte includes ferric chloride and ferrous chloride, the threshold oxidant electrolyte concentration (e.g., total concentration of ferric/ferrous chloride) includes 6 M. In one example, the threshold oxidant electrolyte concentration may correspond to a solubility of the oxidant electrolyte, whereby above the threshold oxidant electrolyte concentration, precipitation of the oxidant electrolyte may occur over operating temperature ranges of the hybrid redox fuel cell. For the case when the oxidant electrolyte includes ferric sulfate and ferrous sulfate, the threshold oxidant electrolyte concentration includes 2 M. In another example, the oxidant electrolyte solution may include a mixture of ferric sulfate and ferrous sulfate, and ferric chloride and ferrous chloride.

The hybrid redox fuel cell 100 further includes a separator 122. The separator 122 may include an electrically-insulating ionic-conducting barrier interposed between and in fluid communication with both the anode compartment 114 and the cathode compartment 116. The separator 122 provides high ionic conductivity while preventing anolyte and catholyte from crossover. In particular, the separator 122 prevents bulk mixing of the reductant 110 (e.g., hydrogen gas) and the oxidant 120 (liquid electrolyte), while allowing conductance of specific ions therethrough. For example, the separator 122 may include an ion-exchange membrane or a microporous membrane. In one embodiment, for the case of the hydrogen-ferric/ferrous ion hybrid redox fuel cell, hydrogen protons (e.g., $H^+$) produced at the anode compartment 114 may cross over to the cathode compartment 116 by way of a selectively ion-permeable membrane (e.g., separator 122). As such, ionic movement and diffusion of the hydrogen protons drive the hydrogen protons into solution at the cathode compartment 116. In contrast, the ion-permeable membrane may be impermeable to bulk liquid and gas, and as such, may preclude crossover of ion species in the liquid electrolyte from the cathode compartment 116 to the anode compartment 114 and crossover of hydrogen gas to from the anode compartment 114 to the cathode compartment 116. In the example of FIG. 1, the separator 122 is interposed between and in direct fluid communication with both the anode 124 and the cathode 126. As such, hydrogen protons generated from hydrogen gas oxidation at the anode surface can readily cross over to the cathode compartment by way of crossover through the separator 122.

Selecting a separator 122 with higher ionic conductivity allows for higher voltaic efficiency of the hybrid redox fuel cell. Furthermore, by selecting a separator 122 with high ion selectivity to reduce electrolyte crossover, the separator 122 allows for higher coulombic efficiency of the hybrid redox fuel cell. Further still, selecting a separator 122 with higher chemical and mechanical stability across the operating conditions of the hybrid redox fuel cell can increase reliability and reduce operational costs.

Although not depicted in FIG. 1, a load external to the fuel cell 100 may be conductively coupled between the anode current collector and the cathode current collector. As such, electrons generated from oxidation of reductant 110 at the anode may flow through the load, supplying power thereto, prior to being supplied to the cathode for the oxidant reduction reaction. Effluent from the hybrid redox fuel cell 100 includes a reductant effluent 118 exiting the anode compartment 114 and an oxidant effluent 128 exiting the anode compartment 114. The reductant effluent 118 can include unreacted reductant 110 and various products of the anode reductant oxidation reaction. The oxidant effluent 128 can include unreacted oxidant 120, products of the oxidant reduction reaction, and other unreactive species in the redox electrolyte solution. In the case of the hydrogen-ferric/ferrous ion hybrid redox fuel cell, the reductant effluent 118 includes unreacted hydrogen gas, while the oxidant effluent 128 includes an electrolyte solution of ferric ion, ferrous ion, hydrogen protons, and oxidant electrolyte anions. In the case where the oxidant electrolyte includes ferric and ferrous chloride, the oxidant electrolyte anions include chloride anions. In the case where the oxidant electrolyte includes ferric and ferrous sulfate, the oxidant electrolyte anions include sulfate anions. In the case where the oxidant electrolyte includes a mixture of ferric and ferrous chloride and ferric and ferrous sulfate, the oxidant electrolyte anions include chloride anions and sulfate anions.

As depicted in FIG. 1, the hybrid redox fuel cell may be operated in a countercurrent flow configuration, whereby supply of the reductant 110 to the anode compartment 114 at a first end 102 of the hybrid redox fuel cell 100 corresponds to discharge of the oxidant effluent 128 from the cathode compartment 116 at the first end 102 of the hybrid redox fuel cell 100; and discharge of the reductant 110 from the anode compartment 114 at a second end 104 of the hybrid redox fuel cell 100 corresponds to supply of the oxidant 120 from the cathode compartment 116 at the second end 104 of the hybrid redox fuel cell 100. In other examples, the hybrid redox fuel cell 100 may be operated in a co-current (e.g., parallel) flow configuration, whereby supply of the reductant 110 to the anode compartment 114 at a first end 102 of the hybrid redox fuel cell 100 corresponds to supply of the oxidant 120 to the cathode compartment 116 at the first end 102 of the hybrid redox fuel cell 100; and discharge of the reductant effluent 118 from the anode compartment 114 at a second end 104 of the hybrid redox fuel cell 100 corresponds to discharge of the oxidant effluent 128 from the cathode compartment 116 at the second end 104 of the hybrid redox fuel cell 100. A countercurrent flow configuration may be advantageous because of increased distribution of reductant 110 and oxidant 120 to and from the electroactive surface area of the anode 124 and cathode 126, respectively.

In some embodiments, operation of the hybrid redox fuel cell according to the methods and systems described herein can include various features in order to reduce performance loss mechanisms characteristic of traditional fuel cell systems. In one example, forced convection of the liquid electrolyte to and within the hybrid redox fuel cell can aid in further increasing the cathode active surface area, helping to ensure that the cathode and carbon surface areas are more completely utilized, thereby increasing oxidant reduction rates thereat. Utilizing forced convection also aids in refreshing electrolyte concentrations at the carbon surface, sweeping away redox products expediently, thereby reducing concentration gradients and mass-transfer limitations to the redox reaction. In one example, forced convection can include turbulent flow of the liquid electrolyte within the cathode compartment 116 to reduce formation of boundary layers at liquid-solid interfaces, thereby further reducing mass transfer limitations.

Furthermore, the hybrid redox fuel cell may include flow field plates (also described herein as flow plates) or structures integrated and/or incorporated with the electrodes or in conjunction with the electrodes to impose a desired flow field configuration for increasing electroactive surface area of the electrode and for increasing distribution of the electrolyte to and from the electroactive surface area of the electrode. As an example, the flow field plates may include an interdigitated flow field (IDFF), serpentine flow field, parallel flow field, and/or other flow fields to aid in distribution of electrolyte evenly across the active electrode surface. The flow field plates may include structural features such as channels and ribs interposed between the channels, and flow field design parameters such as a number of channels, a number ribs, a channel-to-rib ratio, and the like, may be selected to balance increasing flow plate-to-membrane electrode assembly (MEA) contact area (to reduce ohmic resistance) while maintaining adequate diffusion of electrolyte reactants around the ribs to aid in reducing a risk of stagnation (e.g., mass transfer limited) regions thereat. The flow field plates may further be designed to reduce a pressure difference across the separator 122, which aids in reducing undesired anolyte and catholyte crossover. Reducing the pressure difference across the separator 122 in the case of a hydrogen-ferric/ferrous ion hybrid redox fuel cell, can substantially aid in reducing anolyte and catholyte crossover since the anode side reaction occurs in the gas-phase, while the cathode side reaction occurs in the liquid phase.

Increasing uniformity of the flow distribution of electrolyte across the hybrid redox fuel cell electrodes aids in sustaining higher fuel cell efficiencies and prolonging fuel lifetime. Increasing uniformity of the flow distribution may refer to having a more even mass distribution of electrolyte reactants across each flow channel within a single hybrid redox fuel cell. Increasing uniformity of the flow distribution may further refer to having a more even mass distribution of electrolyte reactants across each flow channel and across multiple hybrid redox fuel cells in a multi-cell stack or in a multi-stack energy generation system. Further still, increasing uniformity of flow distribution may refer to supplying adequate mass distribution of electrolyte reactants in the vicinity of the electrolyte effluent discharge on the cathode side of the hybrid redox fuel cell. Said in another way, increasing uniformity of flow distribution of electrolyte refers to reducing overall mass transfer limitations related to electrolyte reactants across the cathode compartment of the hybrid redox fuel cell.

At the same time, a thickness of the cathode may be reduced to reduce ohmic resistance and to reduce electrode manufacturing costs. As such, these electrodes with higher carbon surface area (and reduced thickness) may be provided to aid in reducing a distance between the reaction front and the separator 122 (e.g., sustaining the redox reaction front adjacent to the separator 122 by reducing boundary layer formation and mass transfer limitations), which reduces ohmic losses in the hybrid redox fuel cell, especially as compared to conventional fuel cells. Further performance increases in the hybrid redox fuel cell associated with operational methods and control systems are described hereinbelow with reference to FIG. 8.

Turning now to FIGS. 2 and 3, they illustrate plots 200 and 300 comparing performance of the hybrid redox fuel cells described herein as compared to prior art. By incorporating forced convection and structured flow field features into the hybrid redox fuel cells (as described in greater detail below with reference to FIG. 12), a substantial increase in fuel cell performance and electrical efficiency compared to the prior art is expected. FIG. 2 illustrates a plot of fuel cell voltage versus current density for a hydrogen-air fuel cell 210 and a conventional hybrid redox fuel cell 230, in comparison with that of an improved hybrid redox fuel cell 220 incorporating the performance features (e.g., forced convection, structured flow field elements, electrode design, operational methods and control schemes, and the like) described herein. Owing to insufficient utilization of the cathode active surface area and mass transfer limitations that cause reduced redox reaction rates in the fuel cell, the cell voltage of the conventional hybrid redox fuel cell 230 drops significantly below the cell voltage of the hydrogen-air fuel cell as current density is increased. In contrast, the improved hybrid redox fuel cell 220 is able to achieve cell voltages on par with the hydrogen-air fuel cell 210 at higher current densities (e.g., above 500 mA/cm$^2$). Furthermore, referring to FIG. 3, it illustrates a plot of electrical efficiency versus current density for a hydrogen-air fuel cell 310 as compared with an improved hybrid redox fuel cell 320. The improved hybrid redox fuel cell 320 is able to achieve the higher cell voltages at higher current densities while maintaining a substantially higher electrical efficiency, as compared with hydrogen-air fuel cell 310. In other words, the improved hybrid redox fuel cell is able to achieve on par cell voltage with a traditional hydrogen-air fuel cell at current densities above 500 mA/cm$^2$, but with greater than 80% electrical efficiency, as compared to ~50% electrical efficiency for a traditional hydrogen-air fuel cell.

As discussed previously, the increase in electrical efficiency for the hybrid redox fuel cell as compared to the hydrogen-air fuel cell can be achieved because metal ion reduction rates over the hybrid redox fuel cell carbon cathode are orders of magnitude higher as compared to the oxygen reduction reaction (ORR) at the cathode of a hydrogen-air fuel cell, thereby increasing electrical efficiency and reducing material costs. Furthermore, selecting a metal ion oxidant with a lower redox equilibrium potential as compared with the ORR potential can reduce a risk of fuel cell degradation while facilitating inclusion of less costly fuel cell components. Further still, additional systems for heat recovery are precluded. Further still incorporating forced convection and structured flow field features allows for further increases in fuel cell performance by reducing mass transfer limitations and utilizing more of the electrode active surface area. In this way, the improved hybrid redox fuel cell can generate energy at higher current densities with higher electrical efficiency while reducing material and manufacturing costs, decreasing a risk of fuel cell degradation, simplifying manufacturing complexity, and increasing system reliability, as compared with conventional fuel cell systems.

Turning now to FIG. 4, it illustrates an example cell assembly 400 for the hybrid redox fuel cell of FIG. 1, drawn to scale. A set of reference axes 401 is provided, indicating a y-axis, an x-axis, and a z-axis. The cell assembly 400 includes a series of components arranged as layers within the cell assembly 400. The layers may be positioned co-planar with a y-x plane and stacked along the z-axis. Pressure plates 410 may be arranged at a first end 403 on the anode side of the cell assembly 400 and a second end 405 on the cathode side of the cell assembly 400. The pressure plates 410 provide rigid end walls that define boundaries of the cell assembly 400, and allow layers of the cell assembly 400 to be pressed together between the pressure plates 410 to seal components of the power module within an interior 407 of the cell assembly 400. In one example, the pressure plates 410 include aluminum pressure plates.

The interior 407 of the cell assembly may refer to the components and volume between the pressure plates 410 at the first end 403 and the second end 405 of the cell assembly 400 when the pressure plates 410 are pressed to seal the components of cell assembly 400 together. The interior 407 includes features of the cell assembly 400 corresponding to and defining the anode compartment 114 and cathode compartment 116 of the hybrid redox fuel cell 100. Sealing the cell assembly 400 may be performed by inserting the tie rods 490 through the corresponding tie rod holes 494 in the pressure plates 410 and tightening the tie rod nuts 492, thereby sandwiching and sealing the components and volume of the interior 407 between the first end 403 and the second ends 405 of the cell assembly 400.

Next, components of the interior 407 of the cell assembly 400 are described. The interior surface of the pressure plates 410 may include picture frame structures (not shown in FIG. 4) raised and arranged around the inside perimeter of the pressure plates, e.g., against sides of the pressure plates facing inwards along the z-axis, towards the interior 407 of the cell assembly 400. The picture frame structures may be configured to interface with one another to seal fluids within the interior 407 of the cell assembly 400. In one example, the picture frame structures may include grooves for housing perimeter gaskets seal fluids within the interior 407 of the cell assembly 400.

Elements of the interior 407 of cell assembly 400 at the anode side of the fuel cell are now described along a direction from the first end 403 (e.g., anode side) towards the second end 405 (e.g., cathode side). An anode spacer 452 and anode flow plate 450 are arranged adjacent to the interior surface of the pressure plate 410 positioned at the first end 403, the anode spacer 452 and anode flow plate 450 serving as flow manifolds, defining flow channels for directing and distributing reductant fluid entering the cell assembly 400 across active surfaces of the anode. The reductant may enter and exit the anode side of the cell assembly 400 by way of anode flow ports 454 and 455, one of the anode flow ports 454 and 455 configured to deliver fluid into the anode flow plate 450 of the cell assembly 400 and the other of the anode flow ports configured to discharge fluid from the anode flow plate 450 of the cell assembly 400.

As described above, the flow channels defined by the anode spacer 452 and anode flow plate 450 may include interdigitated flow field, serpentine, parallel, and/or other types of flow channels to aid in more fully distributing the reductant across an active surface area of the anode. An anode current collector 458 and an anode bipolar plate 456 are positioned in face-sharing contact with the anode spacer 452 and anode flow plate 450. The anode bipolar plate 456 includes an integrated electrode (e.g., the anode 124) along a surface of the anode bipolar plate 456. Furthermore, the anode bipolar plate 456 is positioned between the anode spacer 452 and surrounded by the anode flow plate 450 that provides structural support to the bipolar plate 456 and the anode integrated therein.

By positioning the anode current collector directly adjacent to the anode and anode bipolar plate 456, electrons produced from oxidation of the reductant at the anode may be expediently conducted away of the cell assembly 400 for power generation.

A separator 440 is interposed between the anode and cathode sides of the cell assembly 400. In particular, separator 440 may be positioned directly between and adjacent to (e.g., in face-sharing contact with) the anode (and anode bipolar plate 456) and the cathode (and cathode bipolar plate 466). Furthermore, the anode integrated with the anode bipolar plate 456 may correspond to anode 124 and the cathode integrated with the cathode bipolar plate 466 may correspond to cathode 126. Separator 440 may correspond to separator 122 of hybrid redox fuel cell 100, and may include a selectively ion-permeable membrane such as an ion exchange membrane, a microporous membrane, and the like. In the cell assembly 400, the separator 440 may be coupled with and surrounded by a rigid separator frame plate for structural support.

Next, elements of the interior 407 of cell assembly 400 at a cathode side of the fuel cell are now described along a direction from the second end 405 (e.g., cathode side) towards the first end 403 (e.g., anode side). A cathode spacer 462 and cathode flow plate 460 are arranged adjacent to the interior surface of the pressure plate 410 positioned at the second end 405, the cathode spacer 462 and cathode flow plate 460 serving as flow manifolds, defining flow channels for directing and distributing oxidant fluid entering the cell assembly 400 across active surfaces of the cathode. The oxidant may enter and exit the cathode side of the cell assembly 400 by way of cathode flow ports 464 and 465, one of the cathode flow ports 464 and 465 configured to deliver fluid into the cathode flow plate 460 of the cell assembly 400 and the other of the cathode flow ports configured to discharge fluid from the cathode flow plate 460 of the cell assembly 400.

As described above and in further detail with respect to FIG. 12, the flow channels defined by the cathode spacer 462 and cathode flow plate 460 may include interdigitated flow field, serpentine, parallel, and/or other types of flow channels to aid in more fully distributing the oxidant electrolyte across an active surface area of the anode. A cathode current collector 468 and a cathode bipolar plate 466 are positioned in face-sharing contact with a cathode spacer 462 and cathode flow plate 460. The cathode bipolar plate 466 includes an integrated electrode (e.g., the cathode 126) along a surface of the cathode bipolar plate 466. Furthermore, the cathode bipolar plate 466 is positioned between the cathode spacer 462 and surrounded by the cathode flow plate 460 that provides structural support to the cathode bipolar plate 466 and the cathode integrated therein. By positioning the cathode current collector directly adjacent to the cathode and cathode bipolar plate 466, electrons produced from oxidation of the reductant at the anode may be expediently conducted away of the cell assembly 400 for power generation.

One or more reference electrodes 480 may be positioned in the flow paths of the reductant and oxidant of the anode and the cathode sides, respectively, of the cell assembly 400 for setting and indicating a relative potential of the hybrid redox fuel cell and for monitoring the electrode performance during operation of the cell assembly 400. In one example, the reference electrodes 480 may include Ag/AgCl reference electrodes.

The cell assembly may also include various sensors for measuring temperature, conductivity, pH, electrolyte species concentration, gas pressure, and the like, as further described in detail with reference to FIG. 8. As one example, temperature sensors may be positioned at the anode and cathode outlet flow ports to provide an indication of the cell assembly temperature at the anode and cathode sides, respectively. Furthermore, heating elements (not shown in FIG. 4) may be conductively coupled to each of the anode and cathode current collectors. In response to the cell assembly temperature dropping below a lower threshold temperature, power may be supplied to one or more of the heating elements to raise the cell assembly temperature at the anode and/or cathode. Furthermore, thermal switches and/or thermal fuses 459 and 469 may be positioned at one or both of the anode and cathode sides of the fuel cell to stop power generation at the cell assembly 400 when a measured temperature thereat increases above an upper threshold temperature. The upper threshold temperature may correspond to a boiling temperature of the liquid electrolyte, or a temperature above which a degradation risk of seals and/or other components of the cell assembly 400 may be increased.

Increasing the temperature of the hybrid redox fuel cell can increase electrolyte conductivity and kinetic reaction rates of the reductant oxidation at the anode and oxidant reduction at the cathode. However, increasing temperature may also adversely influence electrolyte stability. In some examples, electrolyte stability may decrease with increasing temperature because of increased propensity for electrolyte degradation and/or side reactions. Thus, in another example, the upper threshold temperature may correspond to a temperature above which a risk of electrolyte degradation (e.g., reduced electrolyte stability) is increased. In the case of a hydrogen-ferric/ferrous ion hybrid redox fuel cell, an upper threshold temperature may correspond to a boiling temperature of the liquid electrolyte at the cathode side. Furthermore, a lower threshold temperature may correspond to a freezing temperature of the liquid electrolyte at the cathode side. In the case of a hydrogen-ferric/ferrous ion hybrid redox fuel cell, degradation and precipitation reactions may occur above the boiling temperature of the liquid electrolyte and below the freezing temperature of the liquid electrolyte, respectively.

The gas pressure at the anode compartment 114 may be maintained at a lower threshold gas pressure. Furthermore, the lower threshold gas pressure may be maintained at or slightly above the liquid electrolyte pressure at the cathode compartment 116, so as to reduce a risk of electrode flooding. In one example, the lower threshold gas pressure includes 5 psi above the liquid electrolyte pressure. In another example, the lower threshold gas pressure includes 3 psi above the liquid electrolyte pressure. In another example, the lower threshold gas pressure includes a 1-2 kPa above the liquid electrolyte pressure). In another example, the lower threshold gas pressure includes 1-10 Pa overpressure. The lower threshold gas pressure at the anode compartment is maintained as low as possible to reduce operating costs while maintaining adequately uniform electrolyte and gas flow distributions throughout the hybrid redox fuel cell.

As depicted in the embodiment of FIG. 4, the cell assembly 400 includes a single hybrid redox fuel cell with components therein corresponding to a single anode side and a single cathode side. In another embodiment, the components described above positioned at the interior 407 of the cell assembly 400 (e.g., the anode spacer 452, the anode flow plate 450, the anode flow ports 454 and 455, the anode bipolar plate 456, the anode, the anode current collector 458, the separator 440, the cathode spacer 462, the cathode flow plate 460, the cathode flow ports 464 and 455, the cathode bipolar plate 466, the cathode, the cathode current collector 468) may repeat within the cell assembly, from the first end 403 to the second end 405, a number of times, forming a multi-celled hybrid redox fuel cell stack. Each cell of the hybrid redox fuel cell stack may be electrically connected to generate current in parallel and/or in series.

In one embodiment, the cell assembly 400 may correspond to the hydrogen-ferric/ferrous ion hybrid redox fuel cell, as shown in FIG. 1. In other words, reductant 110 (e.g., hydrogen) is supplied to the anode side of the cell assembly 400, wherein the volume of the anode compartment 114 is defined by the anode spacer 452, anode flow plate 450, and anode bipolar plate 456. Surfaces of the anode bipolar plate 456 and/or the anode (e.g., anode 124) integrated therein may support hydrogen oxidation catalyst thereon to facilitate oxidation of the hydrogen gas (e.g., according to equation (1)). The anode current collector is conductively coupled to the anode bipolar plate 456 and the anode so that electrons may be expediently conducted out of the cell assembly 400 by way of the anode current collector 458 and the anode current collector lead 496. In one example, the anode current collector 458 may include a gold-coated copper current collector. Anode flow ports 454 and 455 may facilitate supply of reductant 110 to the cell assembly 400 and discharge of effluent reductant 118 therefrom.

Similarly, oxidant 120 (e.g., liquid electrolyte including ferric ion oxidant) is supplied to the cathode side of the cell assembly 400, wherein the volume of the cathode compartment 116 is defined by the cathode spacer 462, cathode flow plate 460, and cathode bipolar plate 466. The cathode bipolar plate 466 and/or the cathode (e.g., cathode 126) integrated therein may include carbonaceous surfaces for facilitating the redox reaction. In particular, the cathode may include one or more three-dimensional carbonaceous surfaces such as graphite felt and/or foam, arranged along a face of the cathode bipolar plate 466 opposite of the cathode spacer 462. In one embodiment, the cathode 126 may further include a carbon coated plastic mesh electrode. The mesh structure can allow for increased electroactive surface area, while reducing the amount of electrode active material; accordingly the cost of the expensive conductive materials can be decreased while increasing performance of the hybrid redox fuel cell 100.

Furthermore, the cathode current collector 468 is conductively coupled with and adjacent to the cathode so that electrons may be delivered into the cell assembly 400 at the cathode (by way of the cathode current collector 468 and the cathode current collector lead 498) expediently to drive reduction of ferric ion (e.g., according to equation (2)). In one example, the cathode current collector 468 may include a gold-coated copper current collector. Cathode flow ports 464 and 465 may facilitate supply of oxidant 120 to the cell assembly 400 and discharge of effluent oxidant 128 therefrom. The separator 440 may correspond to separator 122, and may be configured to allow hydrogen protons to cross over from the anode side to the cathode side, while preventing crossover of liquid electrolyte from the cathode side to the anode side.

Turning now to FIG. 12, it illustrates an example of a structured flow field plate 1600 and electrode configuration that can aid in increasing electroactive surface area of the electrode and for increasing distribution of the electrolyte to and from the electroactive surface area of the electrode. The structured flow field plates may be integrated into one or both of the cell assembly 400 of hybrid redox fuel cells 100 and the cell assembly 700 of electrochemical cell oxidant regeneration reactors 600. FIG. 12 is depicted relative to a three-dimensional x-y-z coordinate axis 1602, where the x-axis is aligned in a width-direction, the y-axis is aligned in a length direction, and the z-axis is aligned in a height or thickness direction of an electrode stack assembly, analogous to coordinate axis 401 (see FIG. 4). The z-axis refers to a transverse axis that is perpendicular to the x-y plane of each layer of the electrode stack assembly.

The flow field plate 1600 may include structural features such as flow channels and ribs interposed between the flow channels, and flow field design parameters such as a number of channels, a number ribs, a channel-to-rib ratio, and the like, may be selected to balance increasing flow plate-to-membrane electrode assembly (MEA) contact area (to reduce ohmic resistance) while maintaining adequate diffusion of electrolyte reactants around the ribs to aid in reducing a risk of stagnation (e.g., mass transfer limited) regions thereat. When integrated into a cell assembly 400 of hybrid redox fuel cells 100, the structured flow field plate 1600 may correspond to one or more of anode flow plate 450 and cathode flow plate 460. Furthermore, the flow channels and ribs may be created by arranging the anode spacer 452 or cathode spacer 462 and anode flow plate 450 or cathode flow plate 460 adjacent to the interior surface of the pressure plate 410, respectively. Analogously, when integrated into a cell assembly 700 of electrochemical cell oxidant regeneration reactors 600, the structured flow field plate 1600 may correspond to one or more of anode flow plate 750 and cathode flow plate 760. Furthermore, the flow channels and ribs may be created by arranging the anode spacer 752 or cathode spacer 762 and anode flow plate 750 or cathode flow plate 760 adjacent to the interior surface of the pressure plate 710, respectively.

An example of an interdigitated flow field (IDFF) plate 1600 is shown in FIG. 12 with interdigitated ribs 1612 and 1622 for directing flow of electrolyte at the cathode side of the membrane. In particular, electrolyte may be directed from an inlet 1610 to an outlet 1620 of the flow field plate 1600. As shown in the cross-sectional view 1650 of the interdigitated flow field plate 1600, electrolyte flow (indicated by the arrow 1630) from the interdigitated inlet channels of the interdigitated ribs 1612 to the outlet channels of the interdigitated ribs 1622 can occur by way of the porous electrode 1640, thus providing forced convection of the electrolyte. Here, the porous electrode 1640 may correspond to one or more of anode 124 and/or cathode 126 of the hybrid redox fuel cell 100, as well as anode 624 and/or cathode 626 of the electrochemical cell oxidant regeneration reactor 600. As non-limiting examples, the porous electrode 1640 may include a porous catalyst substrate such as a carbon mesh or carbon foam. In another non-limiting example, the positive electrode may include porous carbon foam and the negative electrode may include porous carbon paper; furthermore, both the positive electrode and the other electrode may include flow field plates. In other non-limiting examples, the flow field plate 1600 may include a non-IDFF flow plate such as a serpentine flow plate, a spiral flow plate, a pin flow plate, or a parallel flow plate with non-interdigitated ribs. Owing to the dead-end channels, the IDFF flow field may be advantageous as compared with other flow fields because electrolyte fluids may be distributed across the flow field more thoroughly, filling the interdigitated dead-end channels before diffusing through the porous electrode 1640 from the inlet channels to the outlet channels.

Turning now to FIGS. 5A and 5B, they illustrate process flow schematics for a traditional hydrogen-air fuel cell system 500 as compared with a higher performing hybrid redox fuel cell system 550, as described herein. In the case of the hydrogen-air fuel cell system 500, a fuel delivery system 512 delivers hydrogen and oxygen (e.g., air) to the hydrogen-air fuel cell stack 510, which outputs power to a power conditioning system 516. The power conditioning system 516 may serve to convert the power generated from the fuel cell system to a practically-usable form. As examples, the power conditioning system 516 may convert direct current to alternating current, transform voltage, and the like, depending on the application. The fuel and air delivery systems 512 and 518, respectively, may include humidifiers for increasing humidity of the hydrogen and/or air and reducing a risk of membrane dehydration. Additionally, compressors, filters and separators may be employed for controlling pressure and purity of the fuel supplied.

Owing to the slow kinetics of the cathodic ORR, traditional hydrogen-air fuel cells are costly (due to utilization of expensive catalysts to increase ORR reaction kinetics) and exhibit lower electrical efficiencies near 40%. In order to increase stack performance and the overall system efficiency through heat recovery, the traditional hydrogen-air fuel cell system 500 includes fuel delivery system 512, air delivery system 518, water management system 514, and thermal management systems 520. For example, the thermal management systems 520 may direct a portion of the waste heat (e.g., water vapor) generated from a hydrogen-air fuel cell to a condenser and a preheater for preheating fuel (e.g., hydrogen, air) to the fuel cell. The remaining portion of the waste heat stream may be directed to a turbine other device to generate power. By incorporating these heat recovery mechanisms (e.g., thermal management systems), the traditional fuel cell system 500 can achieve overall system efficiencies approaching 80%; however, the added system complexity significantly increases manufacturing and operating costs and reduces system reliability.

In contrast, the hybrid redox fuel cell system 550 is simpler when compared with the traditional fuel cell system 500. A fuel delivery system 552 supplies hydrogen gas to the hybrid redox fuel cell stack 554, where the hydrogen gas is oxidized at the anode while oxidant is reduced at the cathode (e.g., higher oxidation state metal ion is reduced to lower oxidation state metal ion in liquid electrolyte). Power generated from the hybrid redox fuel cell stack 554 is supplied to the power conditioning system 558, and oxidant is regenerated (e.g., lower oxidation state metal ion is oxidized back to higher oxidation state metal ion) and supplied to the hybrid redox fuel cell stack 554 by the oxidant delivery system 556. Because water is not a byproduct of the hybrid redox fuel cell process, and because the electrical efficiency of the hybrid redox fuel cell is inherently higher (>80%), the water management system 514, air delivery system 518, and thermal management system 520 are eliminated from the hybrid redox fuel cell system, substantially reducing system complexity as compared with the traditional fuel cell system 500. A simplified system design is advantageous, translating to fewer system components, simpler control algorithms, lower system cost, and increased system reliabilities.

As shown in FIGS. 5B and 5C, the oxidant delivery system 556 includes an oxidant regeneration reactor 562 that regenerates oxidant in the liquid electrolyte from the liquid electrolyte effluent discharged from the cathode of the hybrid redox fuel cell. In particular, the cathode reaction of the hybrid redox fuel cell reduces a metal ion in the liquid electrolyte from a higher oxidation state to a lower oxidation state (e.g., lower in oxidation number than the higher oxidation state). The liquid electrolyte discharged from the cathode and supplied to the oxidant regeneration reactor includes the lower oxidation state metal ion. The oxidant regeneration reactor oxidizes the lower oxidation state metal ion, restoring the metal ion to its higher oxidation state, before returning the liquid electrolyte to the cathode of the hybrid redox fuel cell. In the case of a hydrogen-ferric/ferrous ion hybrid redox fuel cell, ferric ion (higher oxidation state metal ion) is reduced to ferrous ion (lower oxidation state metal ion) at the cathode reaction of the fuel cell. At the oxidant regeneration reactor, the ferrous ion is oxidized back to ferric ion, before being returned to the cathode of the fuel cell.

As demonstrated in the schematic 560, the oxidant regeneration reactor 562 may include various oxidant regeneration processes 570 and various reactor designs 580. In one embodiment, the oxidant regeneration process 570 includes air oxidation 576 by way of an electrochemical cell oxidant regeneration reactor 588, as further described with reference to FIG. 6. Air oxidation of ferrous ion, represented by equation (3), is thermodynamically favorable, but kinetically slow due to the ORR.

$$4Fe^{2+}+O_2+4H^+ \rightarrow 2H_2O+4Fe^{3+} \Delta G° = -42.28 \text{ kcal/mol} \quad (3)$$

Turning now to FIG. 6, it illustrates a process schematic of an example electrochemical cell oxidant regeneration reactor 600. The electrochemical cell oxidant regeneration reactor may be fluidly coupled to a hybrid redox fuel cell 100. In this way, the electrochemical cell oxidant regeneration reactor may regenerate oxidant (e.g., higher oxidation state metal ion, $M^{x+}$) for a cathode side 116 of the hybrid redox fuel cell 100. As further described with reference to FIGS. 8, 10, and 11, the fuel cell system 800 may include one or more electrochemical cell oxidant regeneration reactors 600 fluidly coupled to one or more hybrid redox fuel cells 100. As illustrated in FIG. 6, reductant 610 is supplied to the anode side 614 of an electrochemical cell oxidant regeneration reactor 600, where the reductant 610, flows through the flow field of the anode compartment 614 (also herein referred to as anode side 614) to the anode 624.

The reductant 610 may include a metal ion electrolyte solution, whereby the metal ion electrolyte includes one or more of hydrogen protons, a lower oxidation state metal ion, $M^{(x-1)+}$, and a higher oxidation state metal ion, $M^{x+}$. All or a portion of the reductant 610 may be supplied from the cathode side 116 of the hybrid redox fuel cell 100 to the anode side 614 of the electrochemical cell oxidant regeneration reactor 600. As further described below, liquid electrolyte, including lower oxidation state metal ion, higher oxidation metal ion, hydrogen protons, and supporting electrolyte species may also be supplied to the anode side 614 from an external supporting electrolyte source 806. The hydrogen protons (e.g., $H^+$) supplied to the anode side 614 may cross over to the cathode side 616 by way of a selectively ion-permeable membrane (e.g., separator 622). As such, ionic movement and diffusion of the hydrogen protons drive the hydrogen protons into the gas phase at the cathode side 616. The lower oxidation state metal ion refers to the reduced state of the oxidant 120 and the higher oxidation state metal ion refers to the oxidized state of the oxidant 120.

In the example of FIG. 6, where the electrochemical cell oxidant regeneration reactor 600 regenerates ferric ion for a hydrogen-ferric/ferrous ion hybrid redox fuel cell, the metal ion electrolyte solution includes a solution of ferrous ions (e.g., lower oxidation state metal ion), such as an ionic solution of a ferrous salt. The electrolyte composition of the reductant 610, including metal ion salts, ion complexes, hydrogen protons, and supporting conductive species, can influence electrolyte resistivity, charge-transfer kinetics and overall kinetic rates of reductant oxidation at the anode 624 of the electrochemical cell oxidant regeneration reactor. In one non-limiting example, the reductant electrolyte solution may include ferric sulfate and ferrous sulfate. Furthermore, the reductant electrolyte solution may include sulfuric acid solution, and may further include ferrous and ferric free ions and/or complex compounds. Further still, hydrogen protons produced at the anode side 114 of the hybrid redox fuel cell may cross over separator 122 to the cathode side 116 and flow to the anode side 614 of the electrochemical cell oxidant regeneration reactor 600. Hydrogen protons may also be produced at the anode side 614 from dissociation of water in the presence ferric ion.

The reductant electrolyte may include ferric chloride and ferrous chloride. A concentration of the reductant electrolyte may be maintained up to a threshold reductant electrolyte concentration. When the reductant electrolyte includes ferric chloride and ferrous chloride, the threshold reductant electrolyte concentration includes 6 M. For the case when the reductant electrolyte includes ferric sulfate and ferrous sulfate, the threshold reductant electrolyte concentration includes 2 M. The threshold reductant electrolyte concentration may correspond to a solubility of the reductant electrolyte, whereby above the threshold reductant electrolyte concentration, precipitation of the reductant electrolyte may occur at operating temperature ranges of the electrochemical cell oxidant regeneration reactor.

As indicated by the ferrous ion oxidation chemical equation 611 and the reaction arrow 634, within the anode compartment 614, the lower oxidation state metal ion is fluidly contacted with an oxidation catalyst to produce a higher oxidation state metal ion and an electron, according to the equation (4), the reverse of equation (2). In the case where the lower oxidation state metal ion includes ferrous ion, ferrous ion is fluidly contacted with a ferrous ion oxidation catalyst to produce ferric ion and an electron, according to the equation (4'), the reverse of equation (2').

$$M^{(x-y)+} \rightarrow M^{x+}+e^- \text{(generalized electrochemical cell anode reaction)} \quad (4)$$

$$Fe^{2+} \rightarrow Fe^{3+}+e^- \text{(electrochemical cell anode reaction)} \quad E° = -0.77V \quad (4')$$

$$\tfrac{1}{4}O_2+H^++1e^- \rightarrow \tfrac{1}{2}H_2O \text{(electrochemical cell cathode reaction)} E° = 1.23V \quad (5)$$

Because the standard potential ($E°$) at the cathode is greater than the standard potential at the anode, the resulting Gibbs free energy of the anode and cathode reactions is negative and therefore, the reactions given by equations (4) and (5) (or equations (4') and (5)) occur spontaneously. In one embodiment, one or more external electrical loads 606 conductively couple the anode 624 and the cathode 626 of the electrochemical cell oxidant regeneration reactor, and can be actuated to aid in driving the redox reactions (4) and (5) at the anode and the cathode, respectively. Accordingly, increasing an electrical current supplied from the external electrical load 606 to the electrochemical cell oxidant regeneration reactor may shift the equilibriums of the anode and cathode reactions, thereby increasing a rate of reducing oxygen and a rate of oxidizing metal ion at the lower oxidation state to metal ion at the higher oxidation state. Conversely, reducing an electrical current supplied from the external electrical load 606 to the electrochemical cell oxidant regeneration reactor may decrease a rate of reducing oxygen and a rate of oxidizing metal ion at the lower oxidation state to metal ion at the higher oxidation state. The flow rates and concentrations of reductant 610 and of oxidant 620 may also be regulated by a controller so that a rate of oxidant regeneration (e.g., oxidation of lower oxidation state metal ion to higher oxidation state metal ion at the anode side 614) at the electrochemical cell oxidant regeneration reactor 600 is balanced with a rate of oxidant reduction at the cathode side 116 of the hybrid redox fuel cell 100.

A metal oxidation catalyst may be supported on a surface of the anode 624 so that upon oxidation of the lower oxidation state metal ion, electrons are conducted from the electrochemical cell oxidant regeneration reactor 600 by way of an anode current collector (not shown in FIG. 6) conductively coupled to the anode 624, as depicted schematically by current flow arrow 690. For the case where the metal ion, M, includes iron, the metal oxidation catalyst includes a ferrous oxidation catalyst. The metal oxidation catalyst may include a platinum-based catalyst supported on a carbon substrate. In other examples, the metal oxidation catalyst may include of a small amount (e.g., 0.02 mg/cm$^2$ to >0.2 mg/cm$^2$) of one or a combination of precious metals, such as Pt, Pd, Ru, Rd or their alloys, supported on a conductive carrier, such as carbon.

Simultaneously with the oxidation of reductant 610 at the anode 624, an oxidant 620 (e.g., oxygen) is supplied to the cathode side of the electrochemical cell oxidant regeneration reactor 600, where the oxidant 620 flows through the flow field of the cathode compartment 616 (also herein referred to as cathode side 616) to the cathode 626. In some examples, the oxidant 620 includes only gaseous oxidant without any liquid oxidant. Oxidant 620 may include one or more air and/or oxygen. In the case of a ferrous ion/oxygen electrochemical cell oxidant regeneration reactor 600, as indicated by the oxygen reduction chemical equation 621 and the reaction arrow 636, within the cathode compartment 616, the oxygen and hydrogen protons are fluidly contacted at a catalyst surface at the cathode 626, and electrons are accepted by oxygen, thereby reducing the oxygen and producing water. The catalyst surface at the cathode 626 may include one or a combination of precious metals, such as Pt. Pd, Ru, Rd or their alloys, supported on a conductive carrier, such as carbon. Furthermore, the carbon surface may be supported on the cathode 626 so that electrons conductively supplied into fuel cell (e.g., as depicted by current flow arrow 690) at the cathode surface by the cathode current collector (not shown in FIG. 6) conductively coupled thereto may conducted to the catalyst surface where they can react with the oxygen and hydrogen proton to produce water.

In order to characterize the reaction kinetics of the lower oxidation state metal ion oxidation reaction a kinetic model for the oxidant regeneration reactor 600 may be represented by equations (6)-(8):

$$-r' = N \frac{dX}{dW} \quad (6)$$

$$r' = r/\rho_{cat} \quad (7)$$

$$R = k C_{Me}^u * C_{O2}^v \quad (8)$$

Where r'=rate of reaction (mol/s-g), r=rate of reaction (mol/s-L), R=rate of reaction (mol/s-L), N=molar flow (mol/s), dX=conversion (%), dW=weight of catalyst (g), ρcat=density of catalyst (g/l), C=concentration of species, k=reaction constant (1/s*(L/mol)$^{x+1-1}$), u=the order of reaction on ferrous ion concentration, and v=the order of reaction on oxygen partial pressure.

The electrochemical cell oxidant regeneration reactor 600 further includes a separator 622. The separator 622 may include an electrically-insulating ionic-conducting barrier interposed between and in fluid communication with both the anode compartment 614 and the cathode compartment 616. The separator 622 provides high ionic conductivity while preventing anolyte and catholyte from crossover. In particular, the separator 622 prevents bulk mixing of the reductant 610 (e.g., liquid electrolyte) and the oxidant 620 (oxygen gas), while allowing conductance of specific ions therethrough. For example, the separator 622 may include an ion-exchange membrane or a microporous membrane. In one embodiment, hydrogen protons (e.g., H$^+$) in the liquid electrolyte at the anode compartment 614 may cross over by way of ionic movement and diffusion to the cathode compartment 616 by way of a selectively ion-permeable membrane (e.g., separator 622). In particular, the hydrogen protons are driven through the separator 622 by ionic diffusion to the cathode compartment 616, where they support the oxygen reduction reaction (equation (5)), producing H$_2$O. Hydrogen gas is not consumed or generated at the electrochemical cell oxidant regeneration reactor 600. In contrast, the ion-permeable membrane may be impermeable to bulk liquid and gas, and as such, may preclude crossover of ion species in the liquid electrolyte from the anode compartment 614 to the cathode compartment 616 and crossover of oxygen gas to from the cathode compartment 616 to the anode compartment 614. In the example of FIG. 6, the separator 622 is interposed between and in direct fluid communication with both the anode 624 and the cathode 626. As such, hydrogen protons supplied to the anode can readily cross over to the cathode compartment by way of crossover through the separator 622. Selecting a separator 622 with higher ionic conductivity allows for higher voltaic efficiency of the hybrid redox fuel cell. Furthermore, by selecting a separator 622 with high ion selectivity to reduce electrolyte crossover, the separator 622 allows for higher coulombic efficiency of the hybrid redox fuel cell. Further still, selecting a separator 622 with higher chemical and mechanical stability across the operating conditions of the hybrid redox fuel cell can increase reliability and reduce operational costs.

Effluent from the electrochemical cell oxidant regeneration reactor 600 includes a reductant effluent 618 exiting the anode compartment 614 and an oxidant effluent 628 exiting the anode compartment 614. The reductant effluent 618 can include unreacted reductant 610, various products of the anode reductant oxidation reaction, and other unreactive species in the redox electrolyte solution, as given by equation (4). The oxidant effluent 628 can include unreacted oxidant 620, products of the oxidant reduction reaction, as shown in equation. In the example case depicted in FIG. 6 for a ferrous ion/oxygen electrochemical cell oxidant regeneration reactor, the reductant effluent 618 includes unreacted ferrous ion and ferric ion, according to equation (4'), as well as hydrogen protons and other supporting electrolyte species. As described above with reference to equations (4') and (5), ferrous ion is oxidized to ferric ion at the anode 624, and water readily dissociates in the presence of ferric ion to generate hydrogen protons. The hydrogen protons cross over separator 622 to the cathode side where they combine with oxygen gas at the cathode 626 to produce water. Accordingly, in the example case depicted in FIG. 6, the oxidant effluent 628 includes water and unreacted oxygen gas, according to equation (5). The reductant effluent may be returned to the cathode side 116 of the hybrid redox fuel cell 100, and/or recycled back to the inlet of the electrochemical cell oxidant regeneration reactor 600, as further described with reference to FIG. 8. The oxidant effluent, including predominantly water, may be directed to a storage tank for reuse, or to a drain. During operation of the electrochemical cell oxidant regeneration reactor 600, the oxygen concentration at the inlet oxidant 620 may be adjusted and balanced to reduce an amount of excess oxygen at the oxidant effluent 628, while maintaining a rate of oxygen reduction at the cathode side 616.

Electrochemical cell oxidant regeneration reactor 600 may further include one or more sensors 674 and 676 positioned at the anode side 614 and cathode side 616, respectively, for measuring and transmitting temperature, pressure, electrolyte concentrations, pH, and the like. In some embodiments, sensor 674 may include one or more sensors positioned at a reductant effluent 618, and sensor 676 may include one or more sensors positioned at an oxidant effluent 628.

As depicted in FIG. 6, the electrochemical cell oxidant regeneration reactor 600 may be operated in a countercurrent flow configuration, whereby supply of the reductant 610 to the anode compartment 614 at a first end 602 of the electrochemical cell oxidant regeneration reactor 600 corresponds to discharge of the oxidant effluent 628 from the cathode compartment 616 at the first end 602 of the electrochemical cell oxidant regeneration reactor 600; and discharge of the reductant 610 from the anode compartment 614 at a second end 604 of the electrochemical cell oxidant regeneration reactor 600 corresponds to supply of the oxidant 620 to the cathode compartment 616 at the second end 604 of the electrochemical cell oxidant regeneration reactor 600. In other examples, the electrochemical cell oxidant regeneration reactor 600 may be operated in a co-current (e.g., parallel) flow configuration, whereby supply of the reductant 610 to the anode compartment 614 at a first end 602 of the electrochemical cell oxidant regeneration reactor 600 corresponds to supply of the oxidant 620 to the cathode compartment 616 at the first end 602 of the electrochemical cell oxidant regeneration reactor 600; and discharge of the reductant effluent 618 from the anode compartment 614 at a second end 604 of the electrochemical cell oxidant regeneration reactor 600 corresponds to discharge of the oxidant effluent 628 from the cathode compartment 616 at the second end 604 of the electrochemical cell oxidant regeneration reactor 600. A countercurrent flow configuration may be advantageous in some example systems because of increased distribution of reductant 610 and oxidant 620 to and from the electroactive surface area of the anode 624 and cathode 626, respectively.

In some embodiments, operation of the hybrid redox fuel cell according to the methods and systems described herein can include various features in order to reduce performance loss mechanisms characteristic of traditional fuel cell systems. In one example, forced convection of the liquid electrolyte to and within the hybrid redox fuel cell can aid in further increasing the cathode active surface area, helping to ensure that the cathode and carbon surface areas are more completely utilized, thereby increasing oxidant reduction rates thereat. Utilizing forced convection also aids in refreshing electrolyte concentrations at the carbon surface, sweeping away redox products expediently, thereby reducing concentration gradients and mass-transfer limitations to the redox reaction. In one example, forced convection can include turbulent flow of the liquid electrolyte within the cathode compartment 616 to reduce formation of boundary layers at liquid-solid interfaces, thereby further reducing mass transfer limitations.

Furthermore, the hybrid redox fuel cell may include flow field plates or structures integrated and/or incorporated with the electrodes or in conjunction with the electrodes to impose a desired flow field configuration for increasing electroactive surface area of the electrode and for increasing distribution of the electrolyte to and from the electroactive surface area of the electrode. As an example, the flow field plates may include an interdigitated flow field (IDFF), serpentine flow field, parallel flow field, and other flow fields to aid in distribution of electrolyte evenly across the active electrode surface. The flow field plates may include structural features such as channels and ribs interposed between the channels and parameters such as a number of channels, a number ribs, a channel-to-rib ratio, and the like may be selected to balance increasing flow plate to membrane electrode assembly (MEA) contact area (to reduce ohmic resistance) while maintaining adequate diffusion of electrolyte reactants around the ribs to aid in reducing a risk of stagnation (e.g., mass transfer limited) regions thereat. The flow field plates may further be designed to reduce a pressure difference across the separator 622, which aids in reducing undesired anolyte and catholyte crossover. Reducing the pressure difference across the separator 622 in the case of a hydrogen-ferric/ferrous ion hybrid redox fuel cell, can substantially aid in reducing anolyte and catholyte crossover since the anode side reaction occurs in the gasphase, while the cathode side reaction occurs in the liquid phase.

Increasing uniformity of the flow distribution of electrolyte across the hybrid redox fuel cell electrodes aids in sustaining higher fuel cell efficiencies and prolonging fuel lifetime. Increasing uniformity of the flow distribution may refer to having a more even mass distribution of electrolyte reactants across each flow channel within a single hybrid redox fuel cell. Increasing uniformity of the flow distribution may further refer to having a more even mass distribution of electrolyte reactants across each flow channel and across multiple hybrid redox fuel cells in a multi-cell stack or in a multi-stack energy generation system. Further still, increasing uniformity of flow distribution may refer to supplying adequate mass distribution of electrolyte reactants in the vicinity of the electrolyte effluent discharge on the cathode side of the hybrid redox fuel cell. Said in another way, increasing uniformity of flow distribution of electrolyte refers to reducing overall mass transfer limitations related to electrolyte reactants across the cathode compartment of the hybrid redox fuel cell.

At the same time, a thickness of the cathode may be reduced to reduce ohmic resistance and to reduce electrode manufacturing costs. As such, these electrodes with higher carbon surface area (and reduced thickness) may be provided to aid in reducing a distance between the reaction front and the separator 622 (e.g., sustaining the redox reaction front adjacent to the separator 622 by reducing boundary layer formation and mass transfer limitations), which reduces ohmic losses in the hybrid redox fuel cell, especially as compared to conventional fuel cells. Further performance increases in the hybrid redox fuel cell associated with operational methods and control systems are described hereinbelow with reference to FIG. 8.

Turning now to FIG. 7, it illustrates an example cell assembly 700 for the electrochemical cell oxidant regeneration reactor of FIG. 6, drawn to scale. Analogous to the hybrid redox fuel cell 100 and corresponding cell assembly 400, one or more of the electrochemical cell oxidant regeneration reactor 600 may be configured in a cell assembly 700. A set of reference axes 701 is provided, indicating a y-axis, an x-axis, and a z-axis. The cell assembly 700 includes a series of components arranged as layers within the cell assembly 700. The layers may be positioned coplanar with a y-x plane and stacked along the z-axis.

Pressure plates 710 may be arranged at a first end 703 on the anode side of the cell assembly 700 and a second end 705 on the cathode side of the cell assembly 700. The pressure plates 710 provide rigid end walls that define boundaries of the cell assembly 700, and allow layers of the cell assembly 700 to be pressed together between the pressure plates 710 to seal components of the power module within an interior 707 of the cell assembly 700. In one example, the pressure plates 710 include aluminum pressure plates.

The interior 707 of the cell assembly may refer to the components and volume between the pressure plates 710 at the first end 703 and the second end 705 of the cell assembly 700 when the pressure plates 710 are pressed to seal the components of cell assembly 700 together. The interior 707 includes features of the cell assembly 700 corresponding to and defining the anode compartment 614 and cathode compartment 616 of the electrochemical cell oxidant regeneration reactors 600. Sealing the cell assembly 700 may be performed by inserting the tie rods 790 through the corresponding tie rod holes 794 in the pressure plates 710 and tightening the tie rod nuts 792, thereby sandwiching and sealing the components and volume of the interior 707 between the first end 703 and the second ends 705 of the cell assembly 700.

Next, components of the interior 707 of the cell assembly 700 are described. The interior surface of the pressure plates 710 may include picture frame structures (not shown in FIG. 7) raised and arranged around the inside perimeter of the pressure plates, e.g., against sides of the pressure plates facing inwards along the z-axis, towards the interior 707 of the cell assembly 700. The picture frame structures may be configured to interface with one another to seal fluids within the interior 707 of the cell assembly 700. In one example, the picture frame structures may include grooves for housing perimeter gaskets seal fluids within the interior 707 of the cell assembly 700.

Elements of the interior 707 of cell assembly 700 at the anode side of the fuel cell are now described along a direction from the first end 703 (e.g., anode side) towards the second end 705 (e.g., cathode side). An anode spacer 752 and anode flow plate 750 are arranged adjacent to the interior surface of the pressure plate 710 positioned at the first end 703, the anode spacer 752 and anode flow plate 750 serving as flow manifolds, defining flow channels for directing and distributing reductant fluid entering the cell assembly 700 across active surfaces of the anode. The reductant 610 may enter and exit the anode side of the cell assembly 700 by way of anode flow ports 754 and 755, one of the anode flow ports 754 and 755 configured to deliver fluid into the anode flow plate 750 of the cell assembly 700 and the other of the anode flow ports configured to discharge fluid from the anode flow plate 750 of the cell assembly 700.

As described above, the flow channels defined by the anode spacer 752 and anode flow plate 750 may include interdigitated flow field, serpentine, parallel, and/or other types of flow channels to aid in more fully distributing the reductant across an active surface area of the anode. An anode current collector 758 and an anode bipolar plate 756 are positioned in face-sharing contact with the anode spacer 752 and anode flow plate 750. The anode bipolar plate 756 includes an integrated electrode (e.g., the anode 624) along a surface of the anode bipolar plate 756. Furthermore, the anode bipolar plate 756 is positioned between the anode spacer 752 and surrounded by the anode flow plate 750 that provides structural support to the bipolar plate 756 and the anode integrated therein.

In one example, the anode bipolar plate 756 may include solid graphite plates that are positioned directly adjacent to and in face-sharing contact with the anode 624 in order to and increase electrical conductivity therebetween. In other words, a carbon coated plastic mesh (as described with reference to cathode 126 of cell assembly 400) may be absent from the anode bipolar plate 756 and the anode 624. Increasing the electrical conductivity between the anode bipolar plate 756 and the anode 624 can aid in driving the redox reactions (4) and (5) at the electrochemical cell oxidant regeneration reactor 600 responsive to actuating the external electrical loads 606, thereby increasing a rate of reducing oxygen and a rate of oxidizing metal ion at the lower oxidation state to metal ion at the higher oxidation state. By positioning the anode current collector directly adjacent to the anode and anode bipolar plate 756, electrons produced from oxidation of the reductant at the anode may be expediently conducted away of the cell assembly 700.

A separator 740 is interposed between the anode and cathode sides of the cell assembly 700. In particular, separator 740 may be positioned directly between and adjacent to (e.g., in face-sharing contact with) the anode (and anode bipolar plate 756) and the cathode (and cathode bipolar plate 766). Furthermore the anode integrated with the anode bipolar plate 456 may correspond to anode 624 and the cathode integrated with the cathode bipolar plate 466 may correspond to cathode 626. Separator 740 may correspond to separator 622 of electrochemical cell oxidant regeneration reactor 600, and may include a selectively ion-permeable membrane such as an ion exchange membrane, a microporous membrane, and the like. In the cell assembly 700, the separator 740 may be coupled with and surrounded by a rigid separator frame plate for structural support.

Next, elements of the interior 707 of cell assembly 700 at a cathode side of the fuel cell are now described along a direction from the second end 705 (e.g., cathode side) towards the first end 703 (e.g., anode side). A cathode spacer 762 and cathode flow plate 760 are arranged adjacent to the interior surface of the pressure plate 710 positioned at the second end 705, the cathode spacer 762 and cathode flow plate 760 serving as flow manifolds, defining flow channels for directing and distributing oxidant fluid entering the cell assembly 700 across active surfaces of the cathode. The oxidant may enter and exit the cathode side of the cell assembly 700 by way of cathode flow ports 764 and 765, one of the cathode flow ports 764 and 765 configured to deliver fluid into the cathode flow plate 760 of the cell assembly 700 and the other of the cathode flow ports configured to discharge fluid from the cathode flow plate 760 of the cell assembly 700.

As described above and in further detail with respect to FIG. 12, the flow channels defined by the cathode spacer 762 and cathode flow plate 760 may include interdigitated flow field, serpentine, parallel, and/or other types of flow channels to aid in more fully distributing the oxidant electrolyte across an active surface area of the anode. A cathode current collector 768 and a cathode bipolar plate 766 are positioned in face-sharing contact with a cathode spacer 762 and cathode flow plate 760. The cathode bipolar plate 766 includes an integrated electrode (e.g., the cathode 626) along a surface of the cathode bipolar plate 766. Furthermore, the cathode bipolar plate 766 is positioned between the cathode spacer 762 and surrounded by the cathode flow plate 760 that provides structural support to the cathode bipolar plate 766 and the cathode integrated therein. By positioning the cathode current collector directly adjacent to the cathode and cathode bipolar plate 766, electrons produced from oxidation of the reductant at the anode may be expediently conducted away of the cell assembly 700 for power generation.

One or more reference electrodes 780 may be positioned in the flow paths of the reductant and oxidant of the anode and the cathode sides, respectively, of the cell assembly 700 for setting and indicating a relative potential of the electrochemical cell oxidant regeneration reactor and for monitoring the electrode performance during operation of the cell assembly 700. In one example, the reference electrodes 780 may include Ag/AgCl reference electrodes.

The cell assembly may also include various sensors for measuring temperature, conductivity, pH, electrolyte species concentration, gas pressure, and the like, as further described in detail with reference to FIG. 8. As one example, temperature sensors may be positioned at the anode and cathode outlet flow ports to provide an indication of the cell assembly temperature at the anode and cathode sides, respectively. Furthermore, heating elements (not shown in FIG. 7) may be conductively coupled to each of the anode and cathode current collectors. In response to the cell assembly temperature dropping below a lower threshold oxidant regeneration reactor temperature, power may be supplied to one or more of the heating elements to raise the cell assembly temperature at the anode and/or cathode. Furthermore, thermal switches and/or thermal fuses 759 and 769 may be positioned at one or both of the anode and cathode sides of the fuel cell to stop power generation at the cell assembly 700 when a measured temperature thereat increases above an upper threshold oxidant regeneration reactor temperature. The upper threshold oxidant regeneration reactor temperature may correspond to a temperature above which a degradation risk of seals and/or other components of the cell assembly 700 may be increased.

Increasing the temperature of the electrochemical cell oxidant regeneration reactor can increase electrolyte conductivity and kinetic reaction rates of the reductant oxidation at the anode and oxidant reduction at the cathode. However, increasing temperature may also adversely influence electrolyte stability. In some examples, electrolyte stability may decrease with increasing temperature because of increased propensity for electrolyte degradation and/or side reactions. Thus, in another example, the upper threshold oxidant regeneration reactor temperature may correspond to a temperature above which a risk of electrolyte degradation (e.g., reduced electrolyte stability) is increased. In the case of an electrochemical cell oxidant regeneration reactor for a hydrogen-ferric/ferrous ion hybrid redox fuel system, an upper threshold oxidant regeneration reactor temperature may correspond to a boiling temperature of the liquid electrolyte at the anode side 614. Furthermore, a lower threshold oxidant regeneration reactor temperature may correspond to a freezing temperature of the liquid electrolyte at the cathode side 616. Further still, degradation and precipitation reactions occur above the boiling temperature of the liquid electrolyte and below the freezing temperature of the liquid electrolyte. The electrochemical cell oxidant regeneration reactor 600 may be operated with a pH of the anode compartment 614 being less than 2, to increase stability of the ferric ion in solution and to reduce a risk of ferric ion precipitation.

The gas pressure at the cathode compartment 616 may be maintained at a lower threshold gas pressure to facilitate delivery of the oxygen gas to the catalyst site at the cathode. Furthermore, the lower threshold gas pressure may be maintained at or slightly above the liquid electrolyte pressure at the cathode compartment 616, so as to reduce a risk of liquid crossover and electrode flooding. In one example, the lower threshold gas pressure includes 5 psi above the liquid electrolyte pressure. In another example, the lower threshold gas pressure includes 3 psi above the liquid electrolyte pressure. In another example, the lower threshold gas pressure includes a 1-2 kPa above the liquid electrolyte pressure. The lower threshold gas pressure at the anode compartment is maintained as low as possible to reduce operating costs while maintaining adequately uniform electrolyte and gas flow distributions throughout the electrochemical cell oxidant regeneration reactor 600.

As depicted in the embodiment of FIG. 7, the cell assembly 700 includes a single electrochemical cell oxidant regeneration reactor with components therein corresponding to a single anode side and a single cathode side. In another embodiment, the components described above positioned at the interior 707 of the cell assembly 700 (e.g., the anode spacer 752, the anode flow plate 750, the anode flow ports 754 and 755, the anode bipolar plate 756, the anode, the anode current collector 758, the separator 740, the cathode spacer 762, the cathode flow plate 760, the cathode flow ports 764 and 765, the cathode bipolar plate 766, the cathode, the cathode current collector 768) may repeat within the cell assembly, from the first end 703 to the second end 705, a number of times, forming a multi-celled electrochemical cell oxidant regeneration reactor stack. Each cell of the fuel cell stack may be electrically connected in parallel and/or in series.

In one embodiment, the cell assembly 700 may correspond to electrochemical cell oxidant regeneration reactor 600, as shown in FIG. 6. In other words, reductant 610 (e.g., ferrous ion liquid electrolyte) is supplied to the anode side of the cell assembly 700, wherein the volume of the anode compartment 614 is defined by the anode spacer 752, anode flow plate 750, and anode bipolar plate 756. Surfaces of the anode bipolar plate 756 and/or the anode (e.g., 624) integrated therein may support a ferrous ion (e.g., lower oxidation state metal ion) oxidation catalyst thereon to facilitate oxidation of the ferrous ion (e.g., according to equation (4)). The anode current collector is conductively coupled to the anode bipolar plate 756 and the anode so that electrons may be expediently conducted out of the cell assembly 700 by way of the anode current collector 758. In one example, the anode current collector 758 may include a gold-coated copper current collector. Anode flow ports 754 and 755 may facilitate supply of reductant 610 to the cell assembly 700 and discharge of effluent reductant 618 therefrom.

Similarly, oxidant 620 (e.g., liquid electrolyte including ferric ion oxidant) is supplied to the cathode side of the cell assembly 700, wherein the volume of the cathode compartment 616 is defined by the cathode spacer 762, cathode flow plate 760, and cathode bipolar plate 766. The cathode bipolar plate 766 and/or the cathode (e.g., cathode 626) integrated therein may include carbonaceous surfaces for facilitating the redox reaction. In particular, the cathode may include one or more three-dimensional carbonaceous surfaces such as graphite felt and/or foam, arranged along a face of the cathode bipolar plate 766 opposite of the cathode spacer 762. In one example, the cathode bipolar plate 766 may include solid graphite plates that are positioned directly adjacent to and in face-sharing contact with the cathode in order to and increase electrical conductivity therebetween. In other words, a carbon coated plastic mesh may be absent from the cathode bipolar plate 766 and the cathode 626. Increasing the electrical conductivity between the cathode bipolar plate 766 and the cathode 626 can aid in driving the redox reactions (4) and (5) at the electrochemical cell oxidant regeneration reactor 600 responsive to actuating the external electrical loads 606, thereby increasing a rate of reducing oxygen and a rate of oxidizing metal ion at the lower oxidation state to metal ion at the higher oxidation state.

The cathode current collector 768 is conductively coupled with and adjacent to the cathode so that electrons may be delivered into the cell assembly 700 at the cathode (by way of the cathode current collector 768 and the cathode current collector lead 798) expediently to drive reduction of oxygen gas (e.g., according to equation (5)). In one example, the cathode current collector 768 may include a gold-coated copper current collector. Cathode flow ports 764 and 765 may facilitate supply of oxidant electrolyte 620 to the cell assembly 700 and discharge of oxidant effluent 628 therefrom. The separator 740 may correspond to separator 622, and may be configured to allow hydrogen protons to cross over from the anode side to the cathode side, while preventing crossover of liquid electrolyte from the cathode side to the anode side.

Turning now to FIG. 8, it illustrates a process flow schematic for an example hybrid redox fuel cell system 800, including a hybrid redox fuel cell 100 (as previously described with reference to FIGS. 1 and 4) and electrochemical cell oxidant regeneration reactor 600. As described with reference to FIG. 1, the hybrid redox fuel cell may include a hydrogen-ferric/ferrous ion hybrid redox fuel cell; however, the systems and methods described herein may include other types of hybrid redox fuel cells. In the hybrid redox fuel cell system 800, the hybrid redox fuel cell 100 may include one or more hybrid redox fuel cells 100 electrically connected in series and/or parallel to generate power. As described above with reference to FIG. 4, the one or more hybrid redox fuel cells 100 may include a stack of hybrid redox fuel cells 100 electrically connected together in one or more cell assemblies 400.

Similarly, electrochemical cell oxidant regeneration reactor 600 may include a plurality of electrochemical cell oxidant regeneration reactors 600, each fluidly connected in parallel to the one or more hybrid redox fuel cells such that liquid electrolyte from the cathode side 116 of each hybrid redox fuel cell can be flexibly directed to one or more of the plurality of oxidant regeneration reactors 600. In this way, any one of the electrochemical cell oxidant regeneration reactors 600 can be taken offline for service, without major disruption to operation and power generation of the hybrid redox fuel cell. Furthermore, oxidant regeneration capacity can be more flexibly and reliably increased and decreased to match oxidant reduction rates at the stack(s) of hybrid redox fuel cells as power generation demands vary. As described above with reference to FIG. 7, the one or more electrochemical cell oxidant regeneration reactors 600 may include a stack of electrochemical cell oxidant regeneration reactors 600 electrically connected together in one or more cell assemblies 700. Further still, as shown in FIGS. 8 and 10, each of the electrochemical cell oxidant regeneration reactors 600 may be fluidly connected to the cathode side 116 of one or more hybrid redox fuel cells 100 without (e.g., in the absence of) being fluidly connected to the anode side 114 of the hybrid redox fuel cells 100. More specifically, as shown in FIGS. 8 and 10, an anode side 614 of each of the electrochemical cell oxidant regeneration reactors 600 may be fluidly connected to the cathode side 116 of one or more hybrid redox fuel cells 100 without (e.g., in the absence of) being fluidly connected to the anode side 114 of the hybrid redox fuel cells 100. In other words, the anode side 114 of the hybrid redox fuel cells 100 is fluidly decoupled from the electrochemical cell oxidant regeneration reactors 600, except for the hydrogen protons crossing over from the anode side 114 to the cathode side 116 through the separator 122. Similarly, the cathode side 616 of each of the electrochemical cell oxidant regeneration reactors 600 is fluidly decoupled from the hybrid redox fuel cells 100, except for the hydrogen protons flowing from the cathode side 116 to the anode side 614 and crossing over from the anode side 614 to the cathode side 616 through the separator 622.

The hybrid redox fuel cell 100 may include one or more sensors 834 and 836 positioned at the anode side 114 and the cathode side 116, that transmit data related to the operation of the hybrid redox fuel cell 100 to the controller 812. In one example, the sensors 834 may include a pressure sensor, and a temperature sensor. Similarly, the sensors 836 may include one or more of a pressure sensor, a temperature sensor, an electrolyte concentration sensor, a pH sensor, optical probes, and an electrolyte conductivity sensor. In one embodiment, the one or more sensors 834 and 836 can include sensors positioned at the outlet of the anode side 114 and cathode side 116, respectively, to indicate conditions at the anode side 114 and the cathode side 116.

A power conditioning unit 804 and an external load 802 may be electrically connected between the anode side 114 (by way of the anode current collector at the anode 124) and the cathode side 116 (by way of the cathode current collector at the cathode 126). Power conditioning unit 804 may aid in filtering, converting, storing, and the like, the current generated at the anode prior to delivery of said current to the external load 802. Similarly, power conditioning unit 804 may aid in filtering, converting, storing, and the like, the current returning from external load 802 prior to returning said current to the cathode current collector at the cathode 126. In one example, the power conditioning unit 804 may convert direct current generated at the hybrid redox fuel cell 100 to alternating current for utilization at the external load 802; additionally, the power conditioning unit 804 may convert alternating current discharged from the external load 802 to direct current prior to returning the current to the hybrid redox fuel cell 100. Both the power conditioning unit 804 and the external load 802 may be communicatively coupled with a controller 812. In one example, the controller 812 may adjust an output of the power conditioning unit 804 to the external load 802, based on a power demand signal received from the external load 802. Further still, power conditioning unit 804 may measure the current and/or voltage generated from each hybrid redox fuel cell 100, and communicate the measured current and/or voltage to the controller 812. In this way, the controller 812 can monitor performance of individual hybrid redox fuel cells 100.

A reductant source 805 supplies reductant (e.g., hydrogen gas) to the anode side 114 of the hybrid redox fuel cell 100 by way of a reductant supply flow control device 842 and a reductant supply line 840. In one example, the reductant source 805 includes a pressurized gas cylinder. Reductant supply flow control device 842 may include one or more of a control valve, a flow meter and a pressure regulator for regulating flow and pressure of reductant gas to the anode side 114. Reductant supply flow control device 842 may be communicatively coupled to the controller 812, transmitting reductant supply flow rate and pressure data to the controller 812, and receiving flow rate, valve position, and/or pressure set points from the controller 812. The reductant is oxidized at the anode 124, producing electrons that are conducted to the power conditioning unit 804.

Unreacted reductant as well as byproducts from the reductant oxidation reaction are discharged from the anode side 114 at a reductant discharge line 848 of the hybrid redox fuel cell 100 by way of a reductant discharge flow control device 844. The reductant discharge flow control device 844 may include one or more of a control valve, a flow meter and a pressure regulator for regulating flow and pressure of reductant gas from the anode side 114. Reductant discharge flow control device 844 may be communicatively coupled to the controller 812, transmitting reductant discharge flow rate and pressure data to the controller 812, and receiving flow rate, valve position, and/or pressure set points from the controller 812. In the case where the hybrid redox fuel cell 100 includes a hydrogen-ferric/ferrous ion hybrid redox fuel cell, the reductant includes hydrogen gas, and the reductant discharge includes unreacted hydrogen gas, and may include gaseous hydrogen protons produced by way of reduction reaction equation (1). A portion of the hydrogen protons produced from the hydrogen oxidation reaction may cross over separator 122 to the cathode side 116.

A reductant recycle flow control device 846 may be fluidly coupled between the reductant supply line 840 and the reductant discharge line 848. In this way, a portion of the reductant discharge stream may be recycled to the anode side 114. An amount or flow rate of reductant recycled from the reductant discharge to the anode side 114 may be regulated by the controller 812 adjusting a valve position and/or flow rate and/or pressure of the reductant discharge flow control device 844 and/or the reductant recycle flow control device 846. When the reductant recycle flow control device 846 is fully closed (and the reductant recycle flow control device is open), all of the reductant discharge flows through the reductant discharge flow control device 844; in contrast, when the reductant discharge flow control device 844 is fully closed (and the reductant recycle flow control device is open), all of the reductant discharge flows through the reductant recycle flow control device 846. When the reductant discharge flow control device 844 and the reductant recycle flow control device 846 are both open (partially and/or fully), a portion of the reductant discharge flows through the reductant recycle flow control device 846. In one example, responsive to a reductant concentration at the reductant discharge line 848 being greater than a threshold reductant discharge concentration, the controller 812 may adjust one or more of flow control devices 846 and 844 to increase a reductant recycle flow rate. When the reductant discharge concentration is greater than the threshold reductant discharge concentration, increasing a reductant recycle flow rate may maintain a higher conversion (e.g., oxidation) of reductant at the anode side 114, thereby reduce operational costs.

Next, liquid electrolyte may be supplied to the cathode side 116 by way of an oxidant delivery device (e.g., flow control device 811) such as a pump. The supporting electrolyte source 806 may include liquid electrolyte with one or more of a higher oxidation state metal ion and a lower oxidation state metal ion, wherein the higher oxidation state metal ion is reduced to the lower oxidation state metal ion at the cathode 126 by way of the reduction reaction given by equation (2). The supporting electrolyte source 806 may include one or more electrolyte storage tanks containing various electrolyte solutions. In particular, supporting electrolyte source 806 may include an electrolyte storage tank with the higher oxidation state metal ion and a lower oxidation state metal ion in equilibrium; in another example, supporting electrolyte source 806 may include an electrolyte storage tank with higher oxidation state metal ion and a separate electrolyte storage tank with lower oxidation state metal ion. Furthermore, supporting electrolyte source 806 may further include supporting electrolyte species such as counterions corresponding to the higher and lower oxidation state metal ions. Further still the supporting electrolyte source 806 may include pH regulating species such as hydroxide ion, hydrogen protons, supporting salts, and their corresponding counterions. For the case where the hybrid redox fuel cell 100 is a hydrogen-ferric/ferrous ion hybrid redox fuel cell, the supporting electrolyte source 806 includes one or more of ferric ion and/or ferrous ion, chloride ion, sulfate ion, hydrogen protons, and may further include other supporting electrolyte salt compounds.

As indicated in FIG. 8, supporting electrolyte source 806 may supply electrolyte to one or more of the cathode side 116 and the electrochemical cell oxidant regeneration reactor 600 (anode side 614) by way of oxidant supply pump 810 and one or more flow control devices (positioned between oxidant supply pump 810 and cathode side 116 or anode side 614 of the electrochemical cell oxidant regeneration reactor 600, such as flow control device 811 (other flow control devices not shown). In one example, the supporting electrolyte source 806 may be used to deliver liquid electrolyte (including the higher oxidation state metal ion) to the cathode side 116 during startup of the hybrid redox fuel cell system by way of oxidant supply pump 810. Furthermore, oxidant supply pump 810 may be communicatively coupled to the controller 812, such that the controller 812 may adjust a speed of the oxidant supply pump 810 responsive to a signal received from sensor 807. For example, the controller 812 may switch off the oxidant supply pump 810 in response to a decrease in a level (e.g., volume) of liquid electrolyte at the supporting electrolyte source 806, indicating that a threshold volume of liquid electrolyte has been delivered to the cathode side 116. In another example, after the cathode side 116 is filled with liquid electrolyte, the controller 812 may close a flow control device 811. In another example, after startup of and during continuous operation of the hybrid redox fuel cell, the controller 812 may open the flow control device 811 and adjust a speed of the oxidant supply pump 810 to deliver liquid electrolyte to the cathode side 116 responsive to a threshold oxidant electrolyte condition. The threshold oxidant electrolyte condition may include when a concentration of the oxidant electrolyte at the cathode side 116 falls below a threshold electrolyte concentration.

After startup of, and during continuous operation of the hybrid redox fuel cell system 800, the flow control device 811 may remain closed, and the controller 812 may regulate circulation of reductant gas through the anode side 114 and liquid electrolyte through the cathode side 116. In particular, oxidant discharge may be discharged at the oxidant discharge line 858 to the electrochemical cell oxidant regeneration reactor 600. Flow of the oxidant discharge may be regulated by way of one or more of the oxidant discharge flow control device 854 and the oxidant recirculation pump 857. The oxidant discharge flow control device 854 may include one or more of a control valve, a flow meter and a pressure regulator for regulating flow and pressure of oxidant electrolyte from the cathode side 116. Oxidant discharge flow control device 854 may be communicatively coupled to the controller 812, transmitting oxidant discharge flow rate and pressure data to the controller 812, and receiving flow rate, valve position, and/or pressure set points from the controller 812. Oxidant recirculation pump 857 may be communicatively coupled to the controller 812, transmitting pump speed to the controller 812, and receiving pump speed set point from the controller 812. In the case where the hybrid redox fuel cell 100 includes a hydrogen-ferric/ferrous ion hybrid redox fuel cell, the oxidant discharge includes unreacted ferric ion (e.g., higher oxidation state metal ion), ferrous ion (e.g., lower oxidation state metal ion) produced from the reduction of ferric ion by way of equation (2'), hydrogen protons crossing over from the anode side 114 by way of separator 122, and supporting electrolyte species.

As described with reference to schematic 560, the electrochemical cell oxidant regeneration reactor 600 may include an electrochemical cell oxidant regeneration reactor design for carrying out oxidation (e.g., regeneration) of the lower oxidation state metal ion back to the higher oxidation state metal ion. In particular, the oxidant regeneration process may include air oxidation of the lower oxidation state metal ion, as represented by equation (4). Furthermore, the electrochemical cell oxidant regeneration reactor 600 can supply power to aid in facilitating the oxidation of the lower oxidation state metal ion and reduction of the oxygen.

Electrochemical cell oxidant regeneration reactor 600 may further include one or more sensors 674 and 676 positioned at the anode side 614 and cathode side 616, respectively, for indicating and transmitting temperature, pressure, electrolyte concentrations, pH, and the like thereat to the controller 812. In one example, the one or more sensors 874 may be positioned at the anode discharge line 872, for indicating average conditions inside the anode side 614 of the electrochemical cell oxidant regeneration reactor 600; similarly, the one or more sensors 876 may be positioned at the cathode discharge line 871, for indicating average conditions inside the cathode side 616 of the electrochemical cell oxidant regeneration reactor 600. Electrochemical cell oxidant regeneration reactor 600 may include one or more heaters 873 for regulating temperature of the electrochemical cell oxidant regeneration reactor 600. Non-limiting examples of heater 873 may include one or more of an electrical coil heater, an external jacket heater, an oil heat exchanger, and an in-line pipe heater. In one example, heater 873 may include an in-line pipe heater thermally coupled to the oxidant discharge line 858 of the hybrid redox fuel cell 100 for heating inlet liquid electrolyte to the electrochemical cell oxidant regeneration reactor 600, and an external jacket heater or an electrical coil heater thermally coupled to the electrochemical cell oxidant regeneration reactor 600 for maintaining (or modulating) a temperature of the electrochemical cell oxidant regeneration reactor 600.

Effluent from the anode side 614 of the electrochemical cell oxidant regeneration reactor 600 is delivered by way of anode discharge line 872 and oxidant supply flow control device 852 and oxidant supply line 850 to the cathode side 116 of the hybrid redox fuel cell 100. Oxidant supply flow control device 852 may include one or more of a control valve, a flow meter and a pressure regulator for regulating flow and pressure of oxidant electrolyte to the cathode side 116. Oxidant supply flow control device 852 may be communicatively coupled to the controller 812, transmitting oxidant supply flow rate and pressure data to the controller 812, and receiving flow rate, valve position, and/or pressure set points from the controller 812. Referring to equation (4), effluent may include water, unreacted lower oxidant metal ion, higher oxidant metal ion regenerated (e.g., oxidized) from lower oxidant metal ion, and supporting electrolyte species. In the case where the hybrid redox fuel cell system 800 includes a hydrogen-ferric/ferrous ion hybrid redox fuel cell system, the effluent from the electrochemical cell oxidant regeneration reactor 600 may include ferric ion, ferrous ion, and sulfate ions.

A regeneration recycle flow control device 878 may be positioned in a recycle passage fluidly coupled between the oxidant discharge line 858 and the anode discharge line 872. As non-limiting examples, the regeneration recycle flow control device 878 may include a flow control valve, a pressure regulator, or a mass flow meter communicatively coupled to the controller 812. In this way, a portion of the effluent from the anode side 614 of the electrochemical cell oxidant regeneration reactor 600 may be recycled back to the electrochemical cell oxidant regeneration reactor 600, prior to being returned to the cathode side 116 of the hybrid redox fuel cell 100. An amount or flow rate of effluent recycled from the anode discharge line 872 to the electrochemical cell oxidant regeneration reactor 600 may be regulated by the controller 812 adjusting a % open position and/or flow rate and/or pressure of the regeneration recycle flow control device 878 and/or the oxidant supply flow control device 852. When the regeneration recycle flow control device 878 is fully closed (and the oxidant supply flow control device 852 is open), all of the effluent from the anode side 614 of the electrochemical cell oxidant regeneration reactor 600 flows through the oxidant supply flow control device 852 back to the cathode side 116 of the hybrid redox fuel cell 100; in contrast, when the oxidant supply flow control device 852 is fully closed (and the regeneration recycle flow control device 878 is open), all of the effluent from the anode side 614 of the oxidant regeneration reactor 600 is recycled thereto. When the oxidant supply flow control device 852 and the regeneration recycle flow control device 878 are both open (partially and/or fully open), a portion of the effluent from the anode side 614 of the electrochemical cell oxidant regeneration reactor 600 flows through the regeneration recycle flow control device 878, with the remaining portion returning to the cathode side 116.

In the case of a hydrogen-ferric/ferrous ion hybrid redox fuel cell 100, an electrolyte mixture of ferrous ion (lower oxidation state metal ion), ferric ion (higher oxidation state metal ion), sulfate anions, and acidic protons may be supplied to the anode side 614 of the oxidant regeneration reactor from the hybrid redox fuel cell 100. At anode side 614 of the oxidant regeneration reactor 600, ferrous ion is oxidized (e.g., by way of equation (4')) to ferric ion, thereby regenerating oxidant for the hybrid redox fuel cell 100.

Supporting electrolyte source 806 may include one or more auxiliary storage tanks for supporting electrolyte species, including acids, salt anions, and the like. Supporting electrolyte source 806 may also serve as facilities for batch preparation of electrolyte solutions of salts, acids, and the like, for utilization in the hybrid redox fuel cell system 800. As indicated in FIG. 8, supporting electrolyte source 806 may supply electrolyte to one or more of the cathode side 116 of hybrid redox fuel cell 100 and the anode side 614 of the electrochemical cell oxidant regeneration reactor 600 by way of oxidant supply pump 810 and one or more flow control devices 811 positioned between oxidant supply pump 810 and cathode side 116 (and positioned between oxidant supply pump 810 and anode side 614 of the electrochemical cell oxidant regeneration reactor 600, not shown in FIG. 8). Each of the one or more flow control devices 811 can include one or more of a control valve, a flow meter and a pressure regulator for regulating flow and pressure of oxidant electrolyte to the cathode side 116 and/or anode side 614 of the oxidant regeneration reactor 600. Furthermore oxidant supply pump 810 and each of the one or more flow control devices 811 may be communicatively coupled to the controller 812, transmitting oxidant supply flow rate and pressure data to the controller 812, and receiving flow rate, valve position, and/or pressure set points from the controller 812. In this way, the supporting electrolyte species can be supplied to replenish concentrations thereof at the cathode side 116, and/or oxidant regeneration reactor. In one example, responsive to a rise in pH above an upper threshold regeneration pH at the electrochemical cell oxidant regeneration reactor 600 and/or responsive to a rise in pH above an upper threshold pH at the cathode side 116, the controller 812 may increase a flow rate of acid from supporting electrolyte source 806 to the electrochemical cell oxidant regeneration reactor 600 and/or the cathode side 116. In another example, responsive to a rise in pH above an upper threshold regeneration pH at the electrochemical cell oxidant regeneration reactor 600 and/or responsive to a rise in pH above an upper threshold pH at the cathode side 116, the controller 812 may increase a flow rate of reductant from reductant source 805 to the anode side 114 in order to increase a hydrogen gas oxidation rate at the anode side 114.

In other examples, pH at the hybrid redox fuel cell 100 may be self-regulating, in that hydrogen protons produced by the hydrogen oxidation reaction at the anode side 114 flow through the separator 122 to the cathode side 116 thereby replenishing the hydrogen protons flowing out of the cathode side 116 and regulating the pH thereat. Furthermore, hydrogen protons may flow from the cathode side 116 to the oxidant regeneration reactor 600, replenishing the hydrogen protons consumed by the oxidant regeneration reaction and regulating the pH thereat. In this way, the hybrid redox fuel cell system may operate in a closed loop manner with respect to pH control. In other words, acid from a source external to the hybrid redox fuel cell 100 such as supporting electrolyte source 806 may not be utilized. Instead, the acid hydrogen protons produced by way of hydrogen gas oxidation at the anode side 114 replenish and supply acid to the cathode side 116 and the oxidant regeneration reactor 600. Accordingly, during operation of the hybrid redox fuel cell system in a closed loop manner with respect to pH control, in order to balance and regulate pH, the flow rate of hydrogen gas (e.g., reductant 110 to the anode side 114 may be regulated by controller 812. In particular, a flow rate of hydrogen gas delivered to the anode side 114 may be increased responsive to a decrease in pH at one or more of the cathode side 116 and/or the oxidant regeneration reactor 600. Conversely, a flow rate of hydrogen gas delivered to the anode side 114 may be decreased responsive to an increase in pH at one or more of the cathode side 116 and/or the oxidant regeneration reactor 600.

Regeneration gas source 882 supplies one or more of oxygen and/or air to the electrochemical cell oxidant regeneration reactor 600 by way of a regeneration gas flow control device 884. In one example, the regeneration gas source 882 includes one or more pressurized gas cylinders and/or storage tanks. Regeneration gas flow control device 884 may include one or more of a control valve, a flow meter and a pressure regulator for regulating flow and pressure of reductant gas to the electrochemical cell oxidant regeneration reactor 600. Regeneration gas flow control device 884 may be communicatively coupled to the controller 812, transmitting reductant supply flow rate and pressure data to the controller 812, and receiving flow rate, valve position, and/or pressure set points from the controller 812. The air or oxygen gas is supplied to the cathode side 616 of the oxidant regeneration reactor 600 for reduction thereat to drive the oxidation of the lower oxidation state metal ion as given by equations (4) and (5). Utilizing an oxygen gas source as the regeneration gas source as compared with an air source may be advantageous because higher flow rate and concentrations of oxygen gas directed to the electrochemical cell oxidant regeneration reactor 600 can be achieved, while precluding dilution of the oxygen with nitrogen and carbon dioxide.

In this way, only the cathode side 116 of the hybrid redox fuel cell 100 is fluidly coupled to the oxidant regeneration reactor 600. Said another way, the cathode side 116 of the hybrid redox fuel cell 100 is fluidly coupled to the oxidant regeneration reactor 600 without fluidly coupling the anode side 114 of the hybrid redox fuel cell 100 to the oxidant regeneration reactor 600. As such, liquid electrolyte flows between the cathode side 116 of the hybrid redox fuel cell 100 and the oxidant regeneration reactor 600 without flowing to the anode side 114 of the hybrid redox fuel cell 100. Only gaseous reductant is supplied to the anode side 114 of the hybrid redox fuel cell 100. In particular, liquid electrolyte flows between the cathode side 116 of the hybrid redox fuel cell 100 and the anode side 614 of the oxidant regeneration reactor 600, without flowing to the cathode side 616 of the oxidant regeneration reactor 600. Only gases oxidant is supplied to the cathode side 616 of the oxidant regeneration reactor 600. Further still, a concentration of the lower oxidation state metal ion in the liquid electrolyte directed from the outlet of the cathode side 116 (e.g., oxidant discharge line 858) to the oxidant regeneration reactor 600 may be higher than a concentration of the lower oxidation state metal ion in the liquid electrolyte directed from the outlet of the oxidant regeneration reactor 600 to the cathode side 116. Similarly, a concentration of the higher oxidation state metal ion in the liquid electrolyte directed from the outlet of the cathode side 116 (e.g., oxidant discharge line 858) to the oxidant regeneration reactor 600 may be lower than a concentration of the higher oxidation state metal ion in the liquid electrolyte directed from the outlet of the oxidant regeneration reactor 600 to the cathode side 116.

Controller 812 as shown in FIG. 8 may include a microcomputer, including a microprocessor unit, input/output (I/O) ports, an electronic storage medium for executable programs (e.g., executable instructions) and non-transitory read-only memory (ROM), random access memory (RAM), keep alive memory (KAM), and a data bus. As described herein, controller 812 receives signals from the various sensors and communicates with the various actuators to adjust operation of one or more components of the hybrid redox fuel cell system based on the received signals and instructions stored on a memory of the controller 812.

Controller 812 may receive various signals from sensors coupled to the hybrid redox fuel cell 100, electrochemical cell oxidant regeneration reactor 600, power conditioning unit 804, supporting electrolyte source 806, regeneration gas source 882, and reductant source 805, as well as other components of the hybrid redox fuel cell system 800 such as flow control devices and pumps. Furthermore, controller 812 may transmit signals to various actuators such as pumps, flow control devices, the power conditioning unit 804, and the like, during operation of the hybrid redox fuel cell system 800. Furthermore, upon receiving sensor information, the controller 812 which may, in response, actuate one or more of the various actuators to perform various control functions, as an example. As such, the controller 812 may implement various control strategies responsive to one or a combination of sensors and probes. For example, in response to an increasing power demand at the external load 802, the controller 812 may simultaneously increase a flow rate of reductant supplied to the anode 124 by increasing a valve opening position of reductant supply flow control device 842 and increasing a recirculation flow rate of electrolyte oxidant between the cathode side 116 and the electrochemical cell oxidant regeneration reactor 600 by increasing a speed of oxidant recirculation pump 857.

Controller 812 may regulate operating conditions in the electrochemical cell oxidant regeneration reactor 600 in order to maintain a rate of oxidant regeneration (e.g., oxidation of the metal ion from the lower oxidation state to the higher oxidation state) thereat balanced with (e.g., equal to) a rate of oxidant reduction (e.g., reduction of the metal ion at the higher oxidation state to the metal ion at the lower oxidation state) at the cathode side 116. When a rate of oxidant regeneration at the oxidant regeneration reactor is balanced with the rate of oxidant reduction at the cathode side 116, a total amount of metal ion at the higher oxidation state at the hybrid redox fuel cell 100 and the electrochemical cell oxidant regeneration reactor 600 can be maintained constant. In other words, the total amount of metal ion at the higher oxidation state at the hybrid redox fuel cell 100 and the electrochemical cell oxidant regeneration reactor 600 being constant may correspond to when the oxidant regeneration reactor is operating at steady-state equilibrium. Furthermore, controller 812 may regulate operating conditions in the electrochemical cell oxidant regeneration reactor 600 to reduce a risk of degradation (thermal degradation, precipitation and fouling,) of the electrochemical cell oxidant regeneration reactor 600.

A temperature of the oxidant regeneration reactor may be maintained between a lower threshold oxidant regeneration reactor temperature and an upper threshold oxidant regeneration reactor temperature. When a temperature of the oxidant regeneration reactor decreases below the lower threshold oxidant regeneration reactor temperature, a rate of oxidant regeneration may be too slow. In contrast, when a temperature of the oxidant regeneration reactor increases above the upper threshold regeneration temperature, a risk of degradation hybrid redox fuel cell components can occur (e.g., fouling and occlusion of the separator 622). In one example, the lower oxidant regeneration reactor threshold temperature may include the freezing temperature of the liquid electrolyte, and the upper oxidant regeneration reactor threshold temperature may include the boiling temperature of the liquid electrolyte. The freezing temperature of the liquid electrolyte may be at or below 0 degrees Celsius and the boiling temperature of the liquid electrolyte may be at or above 100 degrees Celsius. Maintaining a higher temperature of the liquid electrolyte may be advantageous because the kinetic reaction rates of the redox reactions in the hybrid redox fuel cell 100 and the oxidant regeneration reactor 600 may be higher; however, operating costs may be increased to maintain and design system components to operate continuously at higher temperatures.

In one example, the controller 812 may increase or decrease power to the one or more heaters 873 in order to increase or decrease, respectively, a temperature of the electrochemical cell oxidant regeneration reactor 600. For instance, responsive to the temperature at the electrochemical cell oxidant regeneration reactor 600 decreasing below the lower threshold oxidant regeneration reactor temperature, the controller 812 may increase power to the one or more heaters 873; responsive to the temperature at the electrochemical cell oxidant regeneration reactor 600 increasing above the upper threshold oxidant regeneration reactor temperature, the controller 812 may decrease power to the one or more heaters 873.

A pH of the liquid electrolyte inside the electrochemical cell oxidant regeneration reactor 600 may be maintained between a lower threshold regeneration pH and an upper threshold regeneration pH. When a pH of the oxidant regeneration reactor decreases below the lower threshold regeneration pH, a rate of oxidant regeneration may be too slow. In contrast, when a temperature of the oxidant regeneration reactor increases above the upper threshold regeneration pH, a risk of degradation hybrid redox fuel cell components can occur due to precipitate formation in the liquid electrolytes which can foul and occlude the separator 622. For the case of a hydrogen-ferric/ferrous ion hybrid redox fuel cell, when a pH increases above the upper threshold regeneration pH, precipitation of ferric hydroxysulfates (e.g., jarosites) can occur.

Above the upper threshold regeneration pH, a solubility of the higher oxidation state metal ion may be reduced, thereby increasing a risk of precipitate formation. The lower regeneration threshold pH and the upper regeneration threshold pH may vary depending on the type and nature of the oxidant regeneration reactor. For the case of a hydrogen ferric/ferrous ion hybrid redox fuel cell, the upper regeneration threshold pH may include 2 (above which a risk of precipitation of ferric ion is increased). In one example, the controller 812 may increase or decrease a flow of acid protons from supporting electrolyte source 806 to the electrochemical cell oxidant regeneration reactor 600 in order to decrease or increase, respectively, an electrolyte pH inside the electrochemical cell oxidant regeneration reactor 600. For instance, responsive to the pH at the electrochemical cell oxidant regeneration reactor 600 decreasing below the lower threshold regeneration pH, the controller 812 may decrease a flow rate of acid protons from the supporting electrolyte source 806 to the electrochemical cell oxidant regeneration reactor 600; responsive to the pH at the electrochemical cell oxidant regeneration reactor 600 increasing above the upper threshold regeneration pH, the controller 812 may increase a flow rate of acid protons from the supporting electrolyte source 806 to the electrochemical cell oxidant regeneration reactor 600. In one embodiment, during operation of the hybrid redox fuel cell system 800, pH at the anode side 614 may be maintained between the lower regeneration threshold pH and the upper regeneration threshold pH by hydrogen protons generated by hydrogen oxidation at the anode side 114 of the hybrid redox fuel cell crossing over separator 122 and flowing to the anode side 614, without supply of acid from a source external to the hybrid redox fuel cell 100 and the oxidant regeneration reactor 600.

A higher oxidation state metal ion concentration, $[M^{x+}]$, and a lower oxidation state metal ion, $[M^{(x-y)+}]$, may be maintained between lower threshold higher oxidation state metal ion and lower threshold lower oxidation state metal ion regeneration concentrations, $[M^{x+}]_{TH,lower}$ and $[M^{(x-y)+}]_{TH,lower}$, respectively, and between upper threshold higher oxidation state metal ion and upper threshold lower oxidation state metal ion regeneration concentrations, $[M^{x+}]_{TH,upper}$ and $[M^{(x-y)+}]_{TH,upper}$, respectively. In one example, the controller 812 may increase or decrease a flow of $[M^{x+}]$ and/or $[M^{(x-y)+}]$ from supporting electrolyte source 806 to the electrochemical cell oxidant regeneration reactor 600 in order to increase or decrease $[M^{x+}]$ and/or $[M^{(x-y)+}]$, respectively, inside the electrochemical cell oxidant regeneration reactor 600. For instance, responsive to $[M^{x+}]$ and/or $[M^{(x-y)+}]$ at the electrochemical cell oxidant regeneration reactor 600 decreasing below $[M^{x+}]_{TH,lower}$ and/or $[M^{(x-y)+}]_{TH,lower}$, respectively, the controller 812 may increase a flow rate $[M^{x+}]$ and/or $[M^{(x-y)+}]$, respectively, from the supporting electrolyte source 806 to the electrochemical cell oxidant regeneration reactor 600; responsive to $[M^{x+}]$ and/or $[M^{(x-y)+}]$ at the electrochemical cell oxidant regeneration reactor 600 increasing above $[M^{x+}]_{TH,upper}$ and/or $[M^{(x-y)+}]_{TH,upper}$, respectively, the controller 812 may decrease a flow rate $[M^{x+}]$ and/or $[M^{(x-y)+}]$, respectively, from the supporting electrolyte source 806 to the electrochemical cell oxidant regeneration reactor 600. $[M^{(x-1)+}]_{TH,lower}$ and $[M^{(x-1)+}]_{TH,upper}$ may vary depending on the type and nature of the oxidant regeneration reactor.

In another example, controller 812 may increase flow rate of effluent recycled back to the oxidant regeneration reactor (e.g., by increasing an open position of the regeneration recycle flow control device) in response to the concentration of higher oxidation state metal ion, $[M^{x+}]$, at the anode discharge line 872 decreasing below $[M^{x+}]_{TH,lower}$. When $[M^{x+}]<[M^{x+}]_{TH,lower}$, a rate of higher oxidation state metal ion reduction at the cathode side 116 is lowered, and power generation at the hybrid redox fuel cell 100 may decrease. By increasing a flow rate of effluent recycled back to the oxidant regeneration reactor, a residence time of the fluid electrolyte in the oxidant regeneration reactor increases, thereby increasing conversion (e.g., oxidation) of the lower oxidation state metal ion to the higher oxidation state metal ion in the oxidant regeneration reactor. Additionally or alternatively, responsive to $[M^{x+}]<[M^{x+}]_{TH,lower}$, the hybrid redox fuel cell cathode side effluent may be directed to a different oxidant regeneration reactor (e.g., a fresh oxidant regeneration reactor), and/or additional metal ion oxidant may be supplied from an external source, such as supporting electrolyte source 806. In another example controller 812 may reduce a flow rate of effluent recycled back to the oxidant regeneration reactor in response to $[M^{x+}]$ at the oxidant discharge line 858 being greater than $[M^{x+}]_{TH,upper}$. By decreasing a flow rate of effluent recycled back to the oxidant regeneration reactor, a residence time of the fluid electrolyte in the oxidant regeneration reactor decreases, thereby decreasing conversion (e.g., oxidation) of the lower oxidation state metal ion to the higher oxidation state metal ion in the oxidant regeneration reactor below $[M^{x+}]_{TH,upper}$.

An oxygen gas concentration, $[O_2]$, at the electrochemical cell oxidant regeneration reactor 600 may be maintained between a lower threshold oxygen regeneration concentration, $[O_2]_{TH,lower}$, and between an upper threshold oxygen regeneration concentration, $[O_2]_{TH,upper}$. In one example, the controller 812 may increase or decrease a flow of $[O_2]$ from regeneration gas source 882 to the electrochemical cell oxidant regeneration reactor 600 in order to increase or decrease $[O_2]$ inside the electrochemical cell oxidant regeneration reactor 600. For instance, responsive to $[O_2]$ at the electrochemical cell oxidant regeneration reactor 600 decreasing below $[O_2]_{TH,lower}$, the controller 812 may increase a flow rate $[O_2]$ from the supporting electrolyte source 806 to the electrochemical cell oxidant regeneration reactor 600; responsive to $[O_2]$ at the electrochemical cell oxidant regeneration reactor 600 increasing above $[O_2]_{TH,upper}$, the controller 812 may decrease a flow rate $[O_2]$ from the supporting electrolyte source 806 to the electrochemical cell oxidant regeneration reactor 600. $[O_2]_{TH,lower}$ and $[O_2]_{TH,upper}$ may depend on the type and nature of the oxidant regeneration reactor. In another example, oxygen gas may be supplied from air; accordingly when oxygen gas is supplied from air, $[O_2]$ may be maintained stably at the air concentration (e.g., approximately 21 mol % in dry air).

Turning now to FIG. 10, it illustrates a schematic of a hybrid redox fuel cell system 1000, including a cell assembly 400 of a stack of N hybrid redox fuel cells 100 fluidly connected with a cell assembly 700 of a stack of M electrochemical cell oxidant regeneration reactors 600 connected in parallel. It is understood that apart from depicting a plurality of hybrid redox fuel cells and a plurality of oxidant regeneration reactors, the hybrid redox fuel cell system 1000 corresponds directly to the hybrid redox fuel cell system 800. In particular, the controller 812, power conditioning unit 804, external load 802, supporting electrolyte source 806, supporting electrolyte source 806, regeneration gas source 882, electrical load 606, as well as several flow control devices, sensors and pumps, are not depicted in FIG. 10 for clarity, however, these components are understood to be included in the hybrid redox fuel cell system 1000.

In the hybrid redox fuel cell system 1000, reductant (e.g., hydrogen gas) is supplied from the reductant source 805 that is fluidly connected in parallel to the anode sides 114 of each of the N hybrid redox fuel cells 100. Effluent from the anode sides 114 may be recycled to the supply side of the anode sides 114 by way of reductant recycle flow control device 846. Furthermore, each hybrid redox fuel cell 100 in the cell assembly 400 is fluidly connected in parallel with the cell assembly 700 of M electrochemical cell oxidant regeneration reactors 600. Regeneration gas source 882 supplies one or more of air and/or oxygen, to each of the oxidant regeneration reactors. A pump 857 and/or oxidant discharge flow control device 854 may be controlled by controller 812 to recirculate liquid electrolyte between the cathode sides 116 of the cell assembly 400 and the anode sides 614 of the electrochemical cell oxidant regeneration reactors 600, thereby regenerating oxidant electrolyte. Flow control devices 852 and 878 may be controlled to adjust a recycle flow rate of liquid electrolyte back to the electrochemical cell oxidant regeneration reactors 600, prior to returning the liquid electrolyte to the cell assembly 400.

In the example of FIG. 10, a single cell assembly 700 of electrochemical cell oxidant regeneration reactors 600 is fluidly connected to a single cell assembly 400 of hybrid redox fuel cells 100. However, in other examples, the hybrid redox fuel cell system 1000 may include a plurality of cell assemblies 400 (e.g., of hybrid redox fuel cells 100) fluidly connected to a plurality of cell assemblies 700 (e.g., of oxidant regeneration reactors). Each cell assembly 400 may be conductively coupled to external load 802 by way of power conditioning unit 804. The power conditioning unit 804 may collect, store, filter, convert, distribute, and the like, power generated from each of the cell assemblies 400 to the external load 802 and may also collect, store, filter, convert, distribute, and the like, power discharged from the load to one or more of the cell assemblies 400.

Each cell assembly 400 may be fluidly connected, by way of upstream valves 1040 and 1052 and downstream valves 1044 and 1054, in parallel to the other cell assemblies 400 and to reductant source 805, supporting electrolyte source 806, and supporting electrolyte source 806. Furthermore, each cell assembly 400 may be fluidly isolated from the hybrid redox fuel cell system 1000, as depicted with the dashed border 1050, by way of upstream valves 1040 and 1052, and downstream valves 1044 and 1054 to enable maintenance of individual cell assemblies 400 while avoiding process downtime. Similarly, each cell assembly 700 may be fluidly connected, by way of upstream valves 1064 and 1084 and downstream valves 1062 and 1078, in parallel to the other cell assemblies 700 and to regeneration gas source 882 and to one or more external electrical loads 606. Furthermore, each cell assembly 700 may be fluidly isolated, as depicted with the dashed border 1060, by way of upstream valves 1064 and 1084, and downstream valves 1062 and 1078 to enable maintenance of individual cell assemblies 700 while avoiding process downtime. Upstream valves 1040, 1052, 1064 and 1084, and downstream valves 1044, 1054, 1062, and 1078 may include flow control devices that transmit and receive signals from the controller 812.

Furthermore, during operation of the hybrid redox fuel cell system 800 and/or 1000, the controller 812 may coordinate operation of the one or more electrochemical cell oxidant regeneration reactors 600 and the one or more hybrid redox fuel cells 100 simultaneously. In particular, depending on the power demand, and the resultant oxidant regeneration demand by the cell assemblies 400, any one or more of the cell assemblies 700 may be utilized. In other words, the controller 812 may open and/or close various sets of upstream valves 1064 and 1084 and downstream valves 1062 and 1078 corresponding to individual cell assemblies 700, in order to bring additional electrochemical cell oxidant regeneration reactors 600 online and/or offline, in order to aid in balancing oxidant regeneration rates (e.g., rate of oxidation of lower oxidation state metal ion) with the rate of oxidant reduction at the cell assemblies 400 (e.g., rate of reduction of higher oxidation state metal ion).

Additionally, the controller 812 may maintain a ratio, Z=M/N, of the number of electrochemical cell oxidant regeneration reactors 600 to the number of hybrid redox flow cells 100, constant to balance the oxidant reduction rate with the oxidant regeneration rate in the hybrid redox fuel cell system 1000. The value of Z may be predetermined, depending on an oxidant regeneration capacity of each of the electrochemical cell oxidant regeneration reactors 600, and the power generation capacity of each of the hybrid redox fuel cells 100. Thus, responsive to additional hybrid redox fuel cells 100 being fluidly connected and brought online in the hybrid redox fuel cell system 1000 for generating power, the controller 812 may bring additional electrochemical cell oxidant regeneration reactors 600 online to maintain the ratio, Z, and to balance a rate of oxidant regeneration (e.g., oxidation of the metal ion from the lower oxidation state to the higher oxidation state) with (e.g., equal to) a rate of oxidant reduction (e.g., reduction of the metal ion at the higher oxidation state to the metal ion at the lower oxidation state) at the cathode sides 116, thereby maintaining a total amount of higher oxidation state metal ion, $M^{x+}_{total}$ across the cell assemblies 400 and the cell assemblies 700 constant. $M^{x+}_{total}$ may be determined by from the respective higher oxidation state metal ion concentrations and volumes corresponding to each online hybrid redox fuel cell 100 and each online electrochemical cell oxidant regeneration reactor 600, as shown in equation (9). In equation (9), $V_{i,cell}$ represents the volume of the $i^{th}$ hybrid redox fuel cell cathode side 116, $([M^{x+}]*V)_{i,cell}$ represents the total amount of $M^{x+}$ in the $i^{th}$ hybrid redox fuel cell cathode side 116, $V_{j,regen}$ represents the free liquid volume of the $j^{th}$ electrochemical cell oxidant regeneration reactor 600. $([M^{x+}]*V)_{j,regen}$ represents the total amount of $M^{x+}$ in the free liquid volume of the $j^{th}$ electrochemical cell oxidant regeneration reactor 600. The free liquid volume refers to the volume space taken up by the free liquid electrolyte in oxidant regeneration reactor, which excludes the volume of the catalyst bed (non-liquid components), flow distribution devices, and other non-liquid components in the oxidant regeneration reactor.

$$M^{x+}_{total} = \Sigma_i ([M^{x+}]*V)_{i,cell} + \Sigma_j ([M^{x+}]*V)_{j,regen} \quad (9)$$

Thus, in the case of a hydrogen-ferric/ferrous ion hybrid redox fuel cell system, the controller 812 may bring additional electrochemical cell oxidant regeneration reactors 600 online responsive to an increase in ferric ion reduction rate at the cathode side 116 of the hybrid redox fuel cells 100 and/or a decrease in ferric ion concentration in the effluent from the cathode side 616 of the electrochemical oxidant regeneration reactors 600, in order to increase an overall rate of ferrous ion oxidation at the electrochemical cell oxidant regeneration reactors 600. Similarly, the controller 812 may bring additional electrochemical cell oxidant regeneration reactors 600 offline responsive to a decrease in ferric ion reduction at the cathode side 116 of the hybrid redox fuel cells 100 and/or an increase in ferric ion concentration in the effluent from the cathode side 616 of the electrochemical cell oxidant regeneration reactors 600, in order to decrease an overall rate of ferrous ion oxidation at the electrochemical cell oxidant regeneration reactors 600. While balancing the oxidant regeneration rate in the oxidant regeneration reactors with the rate of oxidant reduction in the hybrid redox fuel cells, the total amount of higher oxidation state metal ion in the oxidant regeneration reactors and the hybrid redox fuel cells can be maintained constant; as such, a power generation rate of the hybrid redox fuel cell system can be maintained.

In another example, analogous to the control strategies described above with reference to FIG. 8, responsive to a change in $[M^{x+}]$ at the effluent of one or more electrochemical cell oxidant regeneration reactors 600, the controller 812 may adjust an effluent recycle flow rate. For instance, a decrease in $[M^{x+}]$ at the effluent of one or more electrochemical cell oxidant regeneration reactors 600 indicates a decrease in the oxidant regeneration rate (e.g., rate of oxidation of $M^{(x-y)+}$) thereat. Thus, responsive to a decrease in $[M^{x+}]$ at the effluent of a first electrochemical cell oxidant regeneration reactor 600, the controller 812 may increase a flow rate of effluent recycled back to the first oxidant regeneration reactor (to increase residence time therein), and/or increase a flow rate of electrolyte from supporting electrolyte source 806 to the first oxidant regeneration reactor, and/or direct effluent from the cathode side 116 away from the first oxidant regeneration reactor to a second oxidant regeneration reactor while bringing the first oxidant regeneration reactor offline. As additional strategies, responsive to a decrease in $[M^{x+}]$ at the effluent of a first electrochemical cell oxidant regeneration reactor 600, the controller 812 may increase a temperature at the first electrochemical cell oxidant regeneration reactor 600, adjust a pH at the first oxidant regeneration reactor, and/or increase a concentration of oxygen gas at the first oxidant regeneration reactor. At the same time, the controller 812 may regulate pH, temperature, $[M^{x+}]$, $[O_2]$, subject to the upper and lower regeneration threshold values discussed herein.

For the case where one or more of the above control actions taken by controller 812 responsive to a decrease in $[M^{x+}]$ at the effluent of a first oxidant regeneration reactor fails to bring about an increase in $[M^{x+}]$ at the effluent of a first oxidant regeneration reactor, the first oxidant regeneration reactor may be degraded. Degradation of an electrochemical cell oxidant regeneration reactor 600 may occur due to precipitation caused by side reactions in the electrolyte, build-up of impurities, and the like. Responsive to indication of a degraded catalyst bed, the controller 812 may direct effluent from the cathode side 116 away from the first oxidant regeneration reactor to a second oxidant regeneration reactor while bringing the first oxidant regeneration reactor offline.

FIG. 11 illustrates another embodiment of a hybrid redox fuel cell system 800 including a cell assembly 400 with a stack of hybrid redox fuel cells 100, and one or more electrochemical cell oxidant regeneration reactors 600.

Unlike the embodiment depicted in FIG. 10, where electrochemical cell oxidant regeneration reactors 600 are external to the cell assembly 400, hybrid redox fuel cell system 1100 includes a cell assembly 400 including electrochemical cell oxidant regeneration reactors 600 disposed within the cell assembly 400. It is understood that apart from depicting a plurality of hybrid redox fuel cells and a plurality of oxidant regeneration reactors, the hybrid redox fuel cell system 1100 corresponds directly to the hybrid redox fuel cell system 800. In particular, the controller 812, power conditioning unit 804, external load 802, supporting electrolyte source 806, regeneration gas source 882, electrical load 606, as well as several flow control devices, sensors and pumps, are not depicted in FIG. 11 for clarity, however, these components are understood to be included in the hybrid redox fuel cell system 1100.

A hybrid redox fuel cell system 1100 may include a plurality of hybrid redox fuel cells 100 stacked in series and/or in parallel. As shown in FIG. 11, electrochemical cell oxidant regeneration reactors 600 may be integrated into the same cell assembly 1102 (e.g., power module) as the hybrid redox fuel cells 100, but are electrically separated by way of insulators 1140 and 1141. Analogous to the hybrid redox fuel cell systems 800 and 1000, the cathode sides 116 of the hybrid redox fuel cells are fluidly coupled to one or more of the anode sides 614 of the electrochemical cell oxidant regeneration reactors 600 so that the liquid electrolyte can be recirculated therebetween. Furthermore, reductant 110 flows through the anode sides 114 of the hybrid redox fuel cells 100 without being directed to the electrochemical cell oxidant regeneration reactors 600, except for hydrogen protons crossing over separator 122 from the anode side 114 to the cathode side 116. Similarly, oxidant 620 from regeneration gas source 882 flows through the cathode sides 616 of the electrochemical cell oxidant regeneration reactors 600 without being directed to the hybrid redox fuel cells 100. Said another way, the anode sides 114 are fluidly isolated from the electrochemical cell oxidant regeneration reactors 600 and the cathode sides 116 are fluidly isolated from the hybrid redox fuel cells 100, except for hydrogen protons crossing over separator 122 from the anode side 114 to the cathode side 116.

The amount of the liquid electrolyte directed from the hybrid redox fuel cells 100 to the electrochemical cell oxidant regeneration reactors 600 may be regulated by the controller 812 to balance the reduction of higher oxidation state metal ion at the cathode sides 116 with the oxidation of lower oxidation state metal ion at the anode sides 616. Furthermore, the design the hybrid redox fuel cells 100, electrochemical cell oxidant regeneration reactors 600, and their configuration in cell assemblies 400 and 700, respectively, may facilitate regulation of liquid and gas pressures within (e.g., cross pressures) and between individual hybrid redox fuel cells 100 and electrochemical cell oxidant regeneration reactors 600 and between cell assemblies 400 and 700. In one embodiment, the controller 812 may regulate supply of liquid electrolyte and gaseous reactants to the individual hybrid redox fuel cells 100 and electrochemical cell oxidant regeneration reactors 600 and between cell assemblies 400 and 700 based on current (or voltage) demand from the hybrid redox fuel cell system 800.

Furthermore, as described herein, the one or more external loads 606, are regulated by controller 812 to apply currents to the electrochemical cell oxidant regeneration reactors 600 by way of current collectors 1160, 1161, 1162, and 1163 to balance the reduction of higher oxidation state metal ion at the cathode sides 116 with the oxidation of lower oxidation state metal ion at the anode sides 616 and to maintain a total amount of higher oxidation state metal ion in the hybrid redox fuel cells 100 and the electrochemical cell oxidant regeneration reactors 600 constant. In this way, an electrical current may be increased or decreased to the electrochemical cell oxidant regeneration reactors 600 in order to increase or decrease, respectively, the production of $Fe^{3+}$ ions and concomitant reduction of oxygen (by way of reactions (4) and (5)). Additional current collectors 1170 and 1171 may couple the hybrid redox fuel cells 100 to a customer load 1180 for receiving current generated at the hybrid redox fuel cells 100. Pressure plates 410 may be coupled externally to electrochemical cell oxidant regeneration reactors 600. The pressure plates may be separated from the electrochemical cell oxidant regeneration reactors 600 by way of insulators 1195 and 1196.

In this manner, a hybrid redox fuel cell system comprises, a hybrid redox fuel cell including an anode side through which a reductant is flowed, and a cathode side through which a liquid electrolyte is flowed, and an electrochemical cell, wherein an anode side of the electrochemical cell is fluidly coupled to the cathode side of the hybrid redox fuel cell. Furthermore, the liquid electrolyte includes a metal ion at a higher oxidation state and the metal ion at a lower oxidation state. Further still, at the hybrid redox fuel cell, power is generated by reducing the metal ion at the higher oxidation state to the lower oxidation state at the cathode side while oxidizing the reductant at the anode side, and at the anode side of the electrochemical cell, the metal ion at the lower oxidation state is oxidized to the higher oxidation state while the power is generated at the hybrid redox fuel cell. In a first example, the hybrid redox fuel cell system further comprises, wherein the hybrid redox fuel cell includes a hydrogen-ferric/ferrous ion hybrid redox fuel cell, the reductant includes hydrogen gas, the metal ion at the lower oxidation state includes ferrous ion, and the metal ion at the higher oxidation state includes ferric ion. In a second example, optionally including the first example, the hybrid redox fuel cell system further comprises, a pump positioned between the hybrid redox fuel cell and the anode side of the electrochemical cell, wherein the pump directs the liquid electrolyte from the cathode side of the hybrid redox fuel cell to the anode side of the electrochemical cell, without directing the liquid electrolyte to the cathode side of the electrochemical cell. In a third example, optionally including one or more of the first and second examples, the hybrid redox fuel cell system further comprises, wherein, the pump directs the liquid electrolyte, upon exiting the anode side of the electrochemical cell, to the cathode side of the hybrid redox fuel cell, without directing the liquid electrolyte to the anode side of the hybrid redox fuel cell. In a fourth example, optionally including one or more of the first through third examples, the hybrid redox fuel cell system further comprises, wherein, a concentration of the metal ion at the higher oxidation state is higher in the liquid electrolyte directed from the anode side of the electrochemical cell to the cathode side of the hybrid redox fuel cell than the concentration of the metal ion at the higher oxidation state in the liquid electrolyte directed from the cathode side of the hybrid redox fuel cell to the anode side of the electrochemical cell. In a fifth example, optionally including one or more of the first through fourth examples, the hybrid redox fuel cell system further comprises, wherein a rate of reduction of the metal ion at the higher oxidation state to the lower oxidation state at the cathode side of the hybrid redox fuel cell is balanced with the rate of oxidation of the metal ion at the lower oxidation state to the higher oxidation state at the anode side of the electrochemical cell. In a sixth example, optionally including one or more of the first through fifth examples, the hybrid redox fuel cell system further comprises, wherein the cathode side of the electrochemical cell includes a cathode including one or more of Pt, Pd, Ru. Rd, and alloys thereof, and the anode side of the electrochemical cell includes a carbon anode. In a seventh example, optionally including one or more of the first through sixth examples, the hybrid redox fuel cell system further comprises, a regeneration gas source, wherein oxygen gas is directed from the regeneration gas source to the cathode side of the electrochemical cell. In an eighth example, optionally including one or more of the first through seventh examples, the hybrid redox fuel cell system further comprises, an electrical load conductively coupled to the electrochemical cell, wherein supplying a current from the electrical load to the electrochemical cell increases oxidation of the metal ion at the lower oxidation state to the higher oxidation state at the anode side of the electrochemical cell and increases reduction of the oxygen gas at the cathode side of the electrochemical cell.

In this manner, a hybrid redox fuel cell system comprises, a hybrid redox fuel cell, an electrochemical cell, wherein a cathode of the hybrid redox fuel cell is fluidly coupled to an anode of the electrochemical cell, and a controller. Furthermore, the controller includes instructions stored in non-transitory memory thereon, the instructions executable to, recirculate a liquid electrolyte between the cathode of the hybrid redox fuel cell and the anode of the electrochemical cell, wherein the liquid electrolyte includes a metal ion at a higher oxidation state and the metal ion at a lower oxidation state, reduce the metal ion at the higher oxidation state to the lower oxidation state at the cathode of the hybrid redox fuel cell, and oxidize the metal ion at the lower oxidation state to the higher oxidation state at the anode of the electrochemical cell. Further still, wherein a rate of reducing the metal ion at the higher oxidation state to the lower oxidation state at the cathode of the hybrid redox fuel cell is equal to a rate of oxidizing the metal ion at the lower oxidation state to the higher oxidation state at the anode of the electrochemical cell. In a first example, the hybrid redox fuel cell system further comprises an electrical load conductively coupled to the electrochemical cell, wherein the instructions are further executable to supply current to the electrochemical cell from the electrical load to increase the rate of oxidizing the metal ion at the lower oxidation state to the higher oxidation state at the anode of the electrochemical cell. In a second example, optionally including the first example, the hybrid redox fuel cell system further comprises, wherein the instructions are further executable to reduce the current supplied to the electrochemical cell from the electrical load responsive to the rate of oxidizing the metal ion at the lower oxidation state to the higher oxidation state at the anode of the electrochemical cell being greater than the rate of reducing the metal ion at the higher oxidation state to the lower oxidation state at the cathode of the hybrid redox fuel cell. In a third example, optionally including one or more of the first and second examples, the hybrid redox fuel cell system further comprises a reductant source, wherein the instructions are further executable to supply hydrogen from the reductant source to an anode of the hybrid redox fuel cell and oxidize the hydrogen at the anode of the hybrid redox fuel cell while reducing the metal ion at the higher oxidation state to the lower oxidation state at the cathode of the hybrid redox fuel cell to generate power from the hybrid redox fuel cell. In a fourth example, optionally including one or more of the first through third examples, the hybrid redox fuel cell system further comprises an oxygen gas source fluidly coupled to a cathode of the electrochemical cell, wherein the instructions are further executable to supply oxygen to the cathode of the electrochemical cell and reduce the oxygen at the cathode of the electrochemical cell while oxidizing the metal ion at the lower oxidation state to the higher oxidation state at the anode of the electrochemical cell. In a fifth example, optionally including one or more of the first through fourth examples, the hybrid redox fuel cell system further comprises, wherein recirculating the liquid electrolyte between the cathode of the hybrid redox fuel cell and the anode of the electrochemical cell includes recirculating the liquid electrolyte between the cathode of the hybrid redox fuel cell and the anode of the electrochemical cell without recirculating the liquid electrolyte to a cathode of the electrochemical cell and an anode of the hybrid redox fuel cell.

Figure 9:
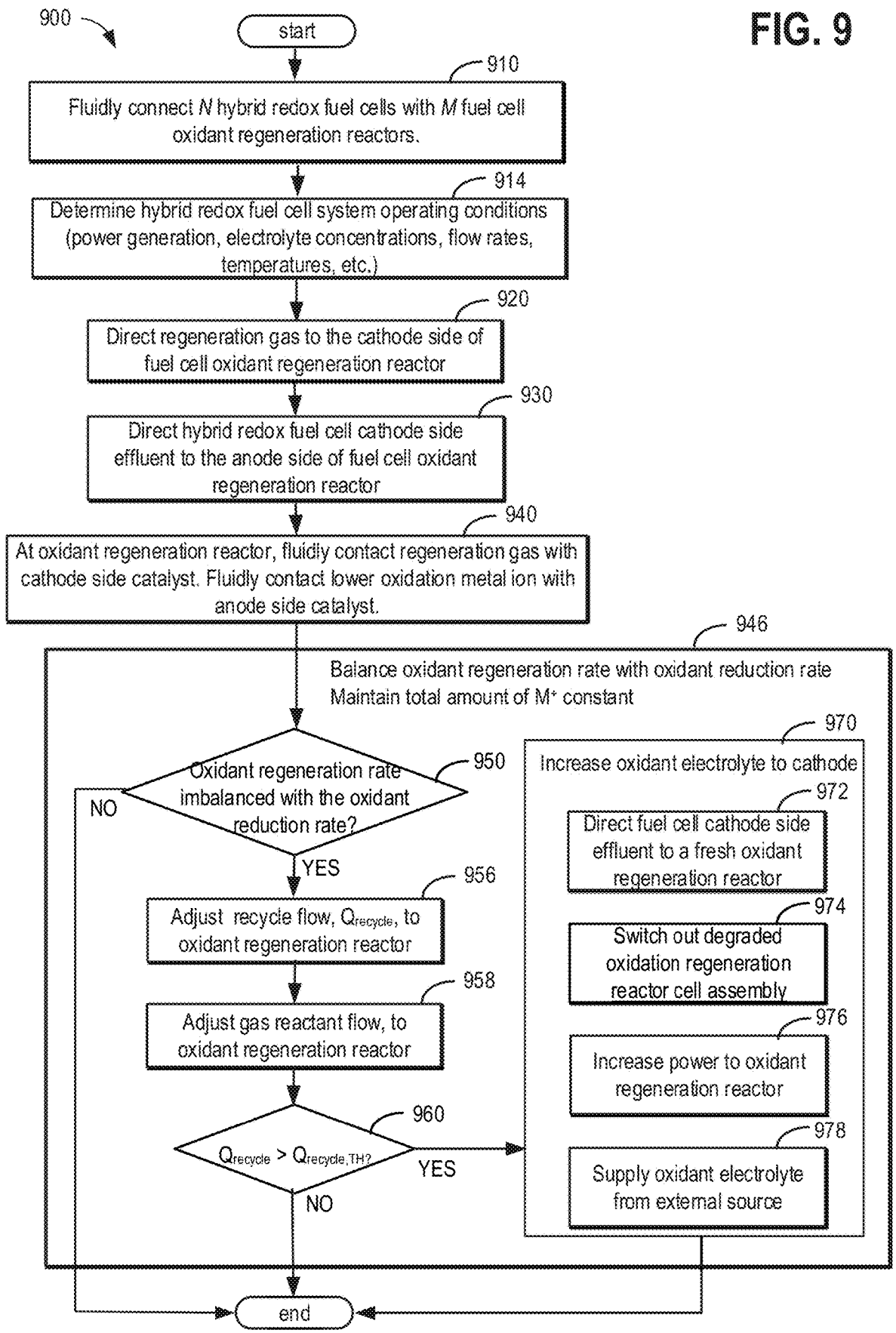
FIG. 9 shows a flow chart for a method for operating the hybrid redox fuel cell systems of FIGS. 8, 10, and 11.

Turning now to FIG. 9, it illustrates a flow chart for an example method 900 of operating the hybrid redox fuel cell system 800 (or hybrid redox fuel cell system 1000). Instructions for carrying out method 900 may be executed by a controller 812 based on instructions stored in non-transitory memory of the controller 812 and in conjunction with signals received from sensors of the hybrid redox fuel cell system 800 (or hybrid redox fuel cell system 1000), such as the sensors described above with reference to FIGS. 1, 4, 8, and 10. The controller 812 may employ actuators of the hybrid redox fuel cell system 800 and/or 1000 to adjust operation of the hybrid redox fuel cell 100, power conditioner, and/or electrochemical cell oxidant regeneration reactor 600, according to the methods described below.

Method 900 begins at 910 where the controller 812 fluidly connects N hybrid redox fuel cells with M electrochemical cell oxidant regeneration reactors. As described herein the N hybrid redox fuel cells may be grouped into s cell assemblies 400 (where s is a natural number), and the M electrochemical cell oxidant regeneration reactors may be grouped into t cell assemblies 700 (where t is a natural number). The number of hybrid redox fuel cells 100, $n_s$ in each $s^{th}$ cell assembly 400 may be different and/or the same, and the number of electrochemical cell oxidant regeneration reactors 600, $m_t$ in each $t^{th}$ cell assembly 700 may be different and/or the same. All of N, M, s, t, $n_s$ and $m_t$ may be predetermined according to predicted power generation demand and/or the desired reaction rate of ferric ion regeneration for the hybrid redox fuel cell system 800.

Method 900 continues at 914 where the controller 812 determines hybrid redox fuel cell system operating conditions such as electrolyte species concentrations, gas pressures and flow rates, temperatures, pH, power generation at the hybrid redox fuel cell 100, and the like. Determining the operating conditions may also include the controller 812 determining calculated quantities from measured parameters such as the reductant oxidation reaction rate at the anode side 114 and the oxidant reduction rate at the cathode side 116, and the associated current delivered to the power conditioning unit 804 and the external load 802.

In one example, the reductant oxidation rate may be calculated from a difference in the steady-state inlet and outlet flows of reductant from each hybrid redox fuel cell 100, while the oxidant reduction rate may be calculated from the difference in inlet and outlet flows of oxidant from each hybrid redox fuel cell 100, as shown by equations (10) and (11):

$$\text{Rate of reductant oxidation(anode side)}[mol/\text{time}] = ([R]_{inlet} - [R]_{outlet})^* Q_{R,tot} \quad (10)$$

$$\text{Rate of oxidant reduction(cathode side)}[mol/\text{time}] = ([M^{x+}]_{inlet} - [M^{x+}]_{outlet})^* Q_{liq,tot} \quad (11)$$

[R] represents the molar concentration of reductant, $Q_{red,tot}$ represents the volumetric flow rate through the anode side 114. $[M^{x+}]$ represents the molar concentration of higher oxidation state metal, and $Q_{liq,tot}$ represents the total volumetric flow rate through the cathode side 116. For the case of a hydrogen-ferric/ferrous ion hybrid redox fuel cell. [R] corresponds to hydrogen gas concentration, $[H_2]$, $Q_{R,tot}$ is the total gas flow rate to the anode side 114, $[M^+]$ corresponds to $[Fe^{3+}]$, and $Q_{liq,tot}$ is the total liquid electrolyte flow rate to the cathode side 116. Furthermore, the associated current delivered from the hybrid redox fuel cell 100 is given by equation (12), and may be determined using the oxidant reduction rate and the stoichiometric ratio of electrons (e.g., y) consumed for each mole of $M^+$ reduced according to equation (2).

$$\text{Current} = (\text{Rate of oxidant reduction})^*(y\ mol\ e^-)/(1mol\ M^+)(1F/mol\ e^-)(96485 C/F) \quad (12)$$

Next, at 920, the controller 812 directs reactant gases (e.g., oxygen, air) to the oxidant regeneration reactor 920. In one example, the flow rate of reactant gases may be determined by the controller 812 by calculating the oxidant reduction rate at the cathode side 116. In particular, the controller 812 may set a flow rate of the oxygen from the regeneration gas source 882 to the electrochemical cell oxidant regeneration reactor 600 corresponding to an oxidant regeneration rate that balances the oxidant reduction rate at the cathode side.

Method 900 continues at 930 where the controller 812 directs effluent from the cathode side 116 to the oxidant regeneration reactor. Effluent from the cathode side 116 may include reactants and products of the cathode side oxidant reduction reaction given by equation (2), including unreacted higher oxidation state metal ion, lower oxidation state metal ion, as well as supporting electrolyte species such as salt counterions and hydrogen protons. In the case where the hybrid redox fuel cell is a hydrogen ferric/ferrous ion fuel cell, the cathode side effluent may include ferric ion, ferrous ion, sulfate ion, and hydrogen protons. One or more sensors 836 may be positioned at the cathode side 116 (including at an outlet thereof) for measuring and transmitting data to the controller 812 associated with electrolyte species concentrations, pH, temperature, and conductivity thereat.

Next at 940, the inlet regeneration gases are fluidly contacted with the catalyst at the cathode 626, and the lower oxidation state metal ion is fluidly contacted with the metal oxidation catalyst at the anode 624. The catalyst at the cathode 626 may include one or a combination of precious metals, such as Pt, Pd, Ru, Rd or their alloys, supported on a conductive carrier, such as carbon. The metal oxidation catalyst at the anode 624 may include a platinum-based catalyst supported on a carbon substrate. In other examples, the metal oxidation catalyst may include of a small amount (e.g., 0.02 mg/cm$^2$ to >0.2 mg/cm$^2$) of one or a combination of precious metals, such as Pt, Pd, Ru, Rd or their alloys, supported on a conductive carrier, such as carbon. In the case where the hybrid redox fuel cell is a hydrogen ferric/ferrous ion fuel cell, oxygen gas is reduced and reacted with hydrogen protons to form water at the cathode side 616, while ferrous ion is oxidized to ferric ion at a catalyst surface of the anode 624, thereby regenerating ferric ion for the cathode side reaction (equation (2)) of the hybrid redox fuel cell. Power may be supplied to the oxidant regeneration reactor to facilitate oxygen reduction and oxidation of ferrous ion to ferric ion at the cathode side 616 and anode side 614, respectively.

Method 900 continues at 946 where the controller 812 balances the oxidant regeneration rate at the electrochemical cell oxidant regeneration reactor 600 with the oxidant reduction rate at the hybrid redox fuel cell cathode side 116. The oxidant regeneration rate refers to a rate of oxidation of the lower oxidation state metal ion to the higher oxidation state metal ion, taking place in one or more electrochemical cell oxidant regeneration reactors 600 of the hybrid redox fuel cell system 800 (e.g., anode side 624 reaction given by equation (4)). The oxidant reduction rate refers to the rate of reduction of the higher oxidation state metal ion to the lower oxidation state metal ion, taking place in one or more hybrid redox fuel cells 100 (e.g., cathode side 116 reaction (2)). When the oxidant regeneration rate is balanced (e.g., equal) with the oxidant reduction rate, the total amount of higher oxidation state metal ion, and the resultant power generated by the hybrid redox fuel cell system, can both be maintained constant at steady state operation of the hybrid redox fuel cell system 800.

In one example, the hybrid redox fuel system may be operated to maintain a desired concentration of [M$^+$] and [M$^{(x-1)+}$] in the cathode side 116 of the hybrid redox fuel cell and in the anode side 614 of the electrochemical cell oxidant regeneration reactor to achieve a desired power generation from the hybrid redox fuel cell system while balancing the oxidant regeneration rate with the oxidant reduction rate. As such, balancing the oxidant regeneration rate with the oxidant reduction rate may include adjusting operation of the hybrid redox fuel system 800 to maintain desired metal ion concentrations in one or more of the hybrid redox fuel cell 100 and the electrochemical cell oxidant regeneration reactor 600. For example, responsive to [M$^+$] at one or more of the cathode side 116 and the anode side 614 being less than a threshold concentration, $[M^+]_{TH}$, the controller 812 may increase a flow rate of the effluent from one or more oxidant regeneration reactors through a regeneration recycle flow control device 878 to recycle more of the effluent back to inlet of the electrochemical cell oxidant regeneration reactor 600; in another example, the controller 812 may responsively increase a supply of [M$^+$] from the supporting electrolyte source 806 through flow control device 811 to one or more of the cathode side 116 of the hybrid redox fuel cell 100 or the anode side 614 of the electrochemical cell oxidant regeneration reactor.

As shown at 946, various strategies to balance the oxidant regeneration rate with the oxidant reduction rate can be employed by the controller 812. At 950, the controller 812 may determine if an oxidant regeneration rate at the electrochemical cell oxidant regeneration reactor 600 and an oxidant reduction rate at the hybrid redox fuel cell 100 are imbalanced. The oxidant regeneration rate for each electrochemical cell oxidant regeneration reactor 600 may be calculated from the difference between oxidant regeneration reactor anode side 614 outlet and inlet concentrations of higher oxidation state metal ion and the total liquid electrolyte flow rate thereto, $Q_{regen,tot}$, according to equation (13). The oxidant reduction rate for each hybrid redox fuel cell 100 may be calculated according to equation (8), described above.

$$\text{Rate of oxidant regeneration(oxidant regen-reactor)}[mol/\text{time}] = ([M^{x+}]_{outlet} - [M^{x+}]_{inlet})^* Q_{regen,tot} \quad (13)$$

In one example, responsive to an oxidant regeneration rate being less than the oxidant reduction rate at 950, the controller 812 at 956, may increase a flow rate of the effluent from one or more oxidant regeneration reactors through a regeneration recycle flow control device 878 to recycle more of the effluent back to inlet of the electrochemical cell oxidant regeneration reactor 600. In another example, responsive to an oxidant regeneration rate being less than the oxidant reduction rate, the controller 812 at 958 may increase a gas reactant flow from regeneration gas source 882 to the oxidant regeneration reactor. Increasing the gas reactant flow can increase a concentration of oxygen at the oxidant regeneration reactor, thereby increasing a rate of oxidant regeneration (equation (13)). Conversely, responsive to an oxidant regeneration rate being greater than the oxidant reduction rate, the controller 812 may decrease a flow rate of the effluent from one or more oxidant regeneration reactors through a regeneration recycle flow control device 878 to recycle less of the effluent back to inlet of the electrochemical cell oxidant regeneration reactor 600; furthermore, the controller 812 may decrease a gas reactant flow from regeneration gas source 882 to the oxidant regeneration reactor.

Next, method 900 continues at 960 where the controller 812 may determine if a recycle flow rate $Q_{recycle}$ to the electrochemical cell oxidant regeneration reactor 600 is greater than a threshold recycle flow rate, $Q_{recycle,TH}$. $Q_{recycle,TH}$ may correspond to a recycle flow rate above which a pressure drop across the oxidant regeneration reactor increases, thereby indicating a reduced efficiency of the oxidant regeneration reactor. For the case where $Q_{recycle} > Q_{recycle,TH}$, method 900 continues at 970, where the controller 812 may employ additional strategies for increasing the oxidant electrolyte supply to the cathode side, and balancing the oxidant reduction rate and the oxidant regeneration rate. For example, at 972, the controller 812 may direct cathode side effluent to a fresh electrochemical cell oxidant regeneration reactor 600. As depicted in FIG. 10, multiple electrochemical cell oxidant regeneration reactors 600 may be fluidly connected to and fluidly isolated from the hybrid redox fuel cell 100 by way of upstream valves 1064 and 1084 and downstream valves 1062 and 1078, respectively. By fluidly connecting an additional oxidant regeneration reactor to the hybrid redox fuel cell, additional oxidant regeneration capacity can be added to the system, thereby increasing an oxidant regeneration rate. At the same time, the controller 812 may switch out a degraded oxidant regeneration reactor cell assembly 700 by fluidly isolating an oxidant regeneration reactor cell assembly 700 from the hybrid redox fuel cell system, at 974. As such, the isolated electrochemical cell oxidant regeneration reactor may be serviced or replaced with a fresh cell assembly 700, before being returned to service, without increasing downtime, and while maintaining operation of the hybrid redox fuel cell system 1000.

In another example, at 978, the controller 812 may supply additional oxidant electrolyte from an external source, such as supporting electrolyte source 806, in order to increase $[M^{x+}]$ at the cathode side 116. Additional oxidant electrolyte may be supplied to one or both of cathode side 116 and anode side 614 from supporting electrolyte source 806 by way of oxidant supply pump 810. In the case where the oxidant regeneration rate is lower than an oxidant reduction rate, an amount of higher oxidation state metal ion returning to the cathode side 116 is reduced. Thus, supplying additional oxidant electrolyte from the supporting electrolyte source 806 can aid in compensating for the decrease in $[M^{x+}]$.

In another example, at 976, the controller 812 may increase power supplied from one or more external electrical loads 606 to one or more electrochemical cell oxidant regeneration reactors 600, in order to increase oxidation of $[M^{(x-y)+}]$ to $[M^{x+}]$ at the anode side 614 and increase oxidant reduction (e.g., reduction of oxygen) at the cathode side 616. As such, controller 812 may increase current applied from one or more external electrical loads 606 to one or more electrochemical cell oxidant regeneration reactors 600 in response to a rate of oxidation of the lower oxidation state metal ion at one or more of the electrochemical cell oxidant regeneration reactors 600 being less than a rate of reduction of the higher oxidation state metal ion at one or more of the hybrid redox fuel cells 100, in order to balance the rate of oxidant reduction at the hybrid redox fuel cells 100 with the rate of oxidant regeneration at the electrochemical cell oxidant regeneration reactors 600. Similarly, controller 812 may decrease current applied from one or more external electrical loads 606 to one or more electrochemical cell oxidant regeneration reactors 600 in response to a rate of oxidation of the lower oxidation state metal ion at one or more of the electrochemical cell oxidant regeneration reactors 600 being greater than a rate of reduction of the higher oxidation state metal ion at one or more of the hybrid redox fuel cells 100, in order to balance the rate of oxidant reduction at the hybrid redox fuel cells 100 with the rate of oxidant regeneration at the electrochemical cell oxidant regeneration reactors 600.

Furthermore, any residual current supplied from electrical loads 606, and/or any voltage generated at electrochemical cell oxidant regeneration reactors 600 may be conserved within the hybrid redox fuel cell system 800. For example, a load may be routed back to the system power bus (e.g., the main DC bus), and the stored load may then be used to power system components, thereby increasing overall system efficiency. Although not shown in FIG. 9, the controller 812 can employ additional strategies for balancing the rate of oxidant reduction with the rate of oxidant regeneration in the hybrid redox fuel cell system. In one example, an oxidant regeneration reactor temperature may be increased to increase an oxidant regeneration reaction rate therein.

Returning to method 900 at 950, for the case where the oxidant regeneration rate and the oxidant reduction rate are not imbalanced, or at 960 for the case where $Q_{recycle}$ is not greater than $Q_{recycle,TH}$, or after 970, method 900 ends.

In this manner, a method of operating a hybrid redox fuel cell system comprises, recirculating a liquid electrolyte between a cathode of a hybrid redox fuel cell of the hybrid redox fuel cell system and an anode of an electrochemical cell, wherein the liquid electrolyte includes a metal ion at a higher oxidation state and the metal ion at a lower oxidation state, reducing the metal ion at the higher oxidation state to the lower oxidation state at the cathode of the hybrid redox fuel cell, and oxidizing the metal ion at the lower oxidation state to the higher oxidation state at the anode of the electrochemical cell. Furthermore, a rate of reducing the metal ion at the higher oxidation state to the lower oxidation state at the cathode of the hybrid redox fuel cell is equal to a rate of oxidizing the metal ion at the lower oxidation state to the higher oxidation state at the anode of the electrochemical cell. In a first example, the method further comprises supplying hydrogen to an anode of the hybrid redox fuel cell and generating power from the hybrid redox fuel cell by oxidizing the hydrogen at the anode of the hybrid redox fuel cell while reducing the metal ion at the higher oxidation state to the lower oxidation state at the cathode of the hybrid redox fuel cell. In a second example, optionally including the first example, the method further comprises, supplying oxygen to a cathode of the electrochemical cell and reducing the oxygen at the cathode of the electrochemical cell while oxidizing the metal ion at the lower oxidation state to the higher oxidation state at the anode of the electrochemical cell. In a third example, optionally including one or more of the first and second examples, the method further comprises, wherein recirculating the liquid electrolyte between the cathode of the hybrid redox fuel cell and the anode of the electrochemical cell includes directing the liquid electrolyte from the cathode of the hybrid redox fuel cell to the anode of the electrochemical cell, and directing the liquid electrolyte from the anode of the electrochemical cell to the cathode of the hybrid redox fuel cell, without flowing the liquid electrolyte to an anode of the hybrid redox fuel cell or a cathode of the electrochemical cell. In a fourth example, optionally including one or more of the first through third examples, the method further comprises increasing a current supplied to the electrochemical cell from an external load responsive to when a rate of reduction of the metal ion at the higher oxidation state to the lower oxidation state at the cathode of the hybrid redox fuel cell is higher than the rate of oxidizing the metal ion at the lower oxidation state to the higher oxidation state at the anode of the electrochemical cell. In a fifth example, optionally including one or more of the first through fourth examples, the method further comprises, decreasing the rate of oxidizing the metal ion at the lower oxidation state to the higher oxidation state at the anode of the electrochemical cell by decreasing the current supplied to the electrochemical cell from the external load. In a sixth example, optionally including one or more of the first through fifth examples, the method further comprises, wherein directing the liquid electrolyte from the anode of the electrochemical cell to the cathode of the hybrid redox fuel cell includes recycling a portion of the liquid electrolyte back to the anode of the electrochemical cell prior to directing the portion of the liquid electrolyte from the anode of the electrochemical cell to the cathode of the hybrid redox fuel cell. In a seventh example, optionally including one or more of the first through sixth examples, the method further comprises, increasing the portion of the liquid electrolyte recycled back to the anode of the electrochemical cell in response to a concentration of the metal ion at the higher oxidation state in the liquid electrolyte at the cathode of the hybrid redox fuel cell being less than a threshold concentration.

FIGS. 4 and 7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 4 and 7 are drawn approximately to scale, although other dimensions or relative dimensions may be used.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid redox fuel cell system, comprising:
a hybrid redox fuel cell including an anode side through which a reductant is flowed, and a cathode side through which a liquid electrolyte is flowed; and
an electrochemical cell, wherein an anode side of the electrochemical cell is fluidly coupled to the cathode side of the hybrid redox fuel cell,
wherein,
the liquid electrolyte includes a metal ion at a higher oxidation state and the metal ion at a lower oxidation state,
at the hybrid redox fuel cell, power is generated by reducing the metal ion at the higher oxidation state to the lower oxidation state at the cathode side while oxidizing the reductant at the anode side, and
at the anode side of the electrochemical cell, the metal ion at the lower oxidation state is oxidized to the higher oxidation state while the power is generated at the hybrid redox fuel cell.

2. The hybrid redox fuel cell system of claim 1, wherein the hybrid redox fuel cell includes a hydrogen-ferric/ferrous ion hybrid redox fuel cell, the reductant includes hydrogen gas, the metal ion at the lower oxidation state includes ferrous ion, and the metal ion at the higher oxidation state includes ferric ion.

3. The hybrid redox fuel cell system of claim 1, further comprising a pump positioned between the hybrid redox fuel cell and the anode side of the electrochemical cell, wherein the pump directs the liquid electrolyte from the cathode side of the hybrid redox fuel cell to the anode side of the electrochemical cell, without directing the liquid electrolyte to the cathode side of the electrochemical cell.

4. The hybrid redox fuel cell system of claim 3, wherein, the pump directs the liquid electrolyte, upon exiting the anode side of the electrochemical cell, to the cathode side of the hybrid redox fuel cell, without directing the liquid electrolyte to the anode side of the hybrid redox fuel cell.

5. The hybrid redox fuel cell system of claim 4, wherein a concentration of the metal ion at the higher oxidation state is higher in the liquid electrolyte directed from the anode side of the electrochemical cell to the cathode side of the hybrid redox fuel cell than the concentration of the metal ion at the higher oxidation state in the liquid electrolyte directed from the cathode side of the hybrid redox fuel cell to the anode side of the electrochemical cell.

6. The hybrid redox fuel cell system of claim 4, wherein a rate of reduction of the metal ion at the higher oxidation state to the lower oxidation state at the cathode side of the hybrid redox fuel cell is balanced with the rate of oxidation of the metal ion at the lower oxidation state to the higher oxidation state at the anode side of the electrochemical cell.

7. The hybrid redox fuel cell system of claim 6, further comprising a regeneration gas source, wherein oxygen gas is directed from the regeneration gas source to the cathode side of the electrochemical cell.

8. The hybrid redox fuel cell system of claim 7, further comprising an electrical load conductively coupled to the electrochemical cell, wherein supplying a current from the electrical load to the electrochemical cell increases oxidation of the metal ion at the lower oxidation state to the higher oxidation state at the anode side of the electrochemical cell and increases reduction of the oxygen gas at the cathode side of the electrochemical cell.

9. A method of operating a hybrid redox fuel cell system, the method comprising:
recirculating a liquid electrolyte between a cathode of a hybrid redox fuel cell of the hybrid redox fuel cell system and an anode of an electrochemical cell, wherein the liquid electrolyte includes a metal ion at a higher oxidation state and the metal ion at a lower oxidation state;
reducing the metal ion at the higher oxidation state to the lower oxidation state at the cathode of the hybrid redox fuel cell; and
oxidizing the metal ion at the lower oxidation state to the higher oxidation state at the anode of the electrochemical cell, wherein
a rate of reducing the metal ion at the higher oxidation state to the lower oxidation state at the cathode of the hybrid redox fuel cell is equal to a rate of oxidizing the metal ion at the lower oxidation state to the higher oxidation state at the anode of the electrochemical cell.

10. The method of claim 9, further comprising supplying hydrogen to an anode of the hybrid redox fuel cell and generating power from the hybrid redox fuel cell by oxidizing the hydrogen at the anode of the hybrid redox fuel cell while reducing the metal ion at the higher oxidation state to the lower oxidation state at the cathode of the hybrid redox fuel.

11. The method of claim 9, further comprising supplying oxygen to a cathode of the electrochemical cell and reducing the oxygen at the cathode of the electrochemical cell while oxidizing the metal ion at the lower oxidation state to the higher oxidation state at the anode of the electrochemical cell.

12. The method of claim 9, wherein recirculating the liquid electrolyte between the cathode of the hybrid redox fuel cell and the anode of the electrochemical cell includes directing the liquid electrolyte from the cathode of the hybrid redox fuel cell to the anode of the electrochemical cell, and directing the liquid electrolyte from the anode of the electrochemical cell to the cathode of the hybrid redox fuel cell, without flowing the liquid electrolyte to an anode of the hybrid redox fuel cell or a cathode of the electrochemical cell.

13. The method of claim 12, further comprising increasing a current supplied to the electrochemical cell from an external load responsive to when a rate of reduction of the metal ion at the higher oxidation state to the lower oxidation state at the cathode of the hybrid redox fuel cell is higher than the rate of oxidizing the metal ion at the lower oxidation state to the higher oxidation state at the anode of the electrochemical cell.

14. The method of claim 13, wherein directing the liquid electrolyte from the anode of the electrochemical cell to the cathode of the hybrid redox fuel cell includes recycling a portion of the liquid electrolyte back to the anode of the electrochemical cell prior to directing the portion of the liquid electrolyte from the anode of the electrochemical cell to the cathode of the hybrid redox fuel cell.

15. The method of claim 14, further comprising increasing the portion of the liquid electrolyte recycled back to the anode of the electrochemical cell in response to a concentration of the metal ion at the higher oxidation state in the liquid electrolyte at the cathode of the hybrid redox fuel cell being less than a threshold concentration.

16. A hybrid redox fuel cell system, comprising:
a hybrid redox fuel cell;
an electrochemical cell, wherein a cathode of the hybrid redox fuel cell is fluidly coupled to an anode of the electrochemical cell; and
a controller including instructions stored in non-transitory memory thereon, the instructions executable to:
recirculate a liquid electrolyte between the cathode of the hybrid redox fuel cell and the anode of the electrochemical cell, wherein the liquid electrolyte includes a metal ion at a higher oxidation state and the metal ion at a lower oxidation state;
reduce the metal ion at the higher oxidation state to the lower oxidation state at the cathode of the hybrid redox fuel cell; and
oxidize the metal ion at the lower oxidation state to the higher oxidation state at the anode of the electrochemical cell.

17. The hybrid redox fuel cell system of claim 16, wherein a rate of reducing the metal ion at the higher oxidation state to the lower oxidation state at the cathode of the hybrid redox fuel cell is equal to a rate of oxidizing the metal ion at the lower oxidation state to the higher oxidation state at the anode of the electrochemical cell.

18. The hybrid redox fuel cell system of claim 16, further comprising an electrical load conductively coupled to the electrochemical cell, wherein the instructions are further executable to supply a current to the electrochemical cell from the electrical load to increase the rate of oxidizing the metal ion at the lower oxidation state to the higher oxidation state at the anode of the electrochemical cell.

19. The hybrid redox fuel cell system of claim 17, wherein the instructions are further executable to reduce the current supplied to the electrochemical cell from the electrical load responsive to the rate of oxidizing the metal ion at the lower oxidation state to the higher oxidation state at the anode of the electrochemical cell being greater than the rate of reducing the metal ion at the higher oxidation state to the lower oxidation state at the cathode of the hybrid redox fuel cell.

20. The hybrid redox fuel cell system of claim 16, wherein recirculating the liquid electrolyte between the cathode of the hybrid redox fuel cell and the anode of the electrochemical cell includes recirculating the liquid electrolyte between the cathode of the hybrid redox fuel cell and the anode of the electrochemical cell without recirculating the liquid electrolyte to a cathode of the electrochemical cell and an anode of the hybrid redox fuel cell.

\* \* \* \* \*